(12) United States Patent
Dancejic

(10) Patent No.: US 11,567,193 B2
(45) Date of Patent: Jan. 31, 2023

(54) RETRIEVING WEATHER DATA FROM MEMORY

(71) Applicant: Honeywell International Inc., Morris Plains, NJ (US)

(72) Inventor: Goran Dancejic, Redmond, WA (US)

(73) Assignee: Honeywell International Inc., Charlotte, NC (US)

(*) Notice: Subject to any disclaimer, the term of this patent is extended or adjusted under 35 U.S.C. 154(b) by 224 days.

(21) Appl. No.: 16/852,218

(22) Filed: Apr. 17, 2020

(65) Prior Publication Data

US 2021/0325532 A1    Oct. 21, 2021

(51) Int. Cl.
*G01S 13/95* (2006.01)
*B64D 45/00* (2006.01)
*G08G 5/00* (2006.01)

(52) U.S. Cl.
CPC ............ *G01S 13/953* (2013.01); *B64D 45/00* (2013.01); *G08G 5/0004* (2013.01); *G08G 5/0039* (2013.01)

(58) Field of Classification Search
CPC .... G01S 13/953; B64D 45/00; G08G 5/0004; G08G 5/0039
See application file for complete search history.

(56) References Cited

U.S. PATENT DOCUMENTS

| | | | |
|---|---|---|---|
| 6,667,710 B2 | 12/2003 | Cornell et al. | |
| 6,720,906 B2 | 4/2004 | Szeto et al. | |
| 6,839,018 B2 | 1/2005 | Szeto et al. | |
| 7,486,220 B1* | 2/2009 | Kronfeld | G01W 1/10 342/26 B |
| 9,483,951 B1* | 11/2016 | McCusker | G08G 5/0052 |
| 9,613,269 B2 | 4/2017 | Kilty et al. | |
| 9,967,707 B2 | 5/2018 | Esposito et al. | |
| 10,061,024 B1* | 8/2018 | Fersdahl | G01S 13/953 |
| 10,215,840 B2 | 2/2019 | Wang | |
| 10,371,793 B2 | 8/2019 | Wang | |

(Continued)

FOREIGN PATENT DOCUMENTS

WO    WO-03007021 A2 *  1/2003  ........... G01S 13/953

OTHER PUBLICATIONS

M.M. Wolfson, et al. Tactical 0-2 Hour Convective Weather Forecasts For FAA, retrieved Jan. 13, 2022, available at http://citeseerx.ist.psu.edu/viewdoc/download?doi=10.1.1.360.5020&rep=rep1&type=pdf (Year: 2004).*

(Continued)

*Primary Examiner* — Maceeh Anwari
*Assistant Examiner* — Charles Pall
(74) *Attorney, Agent, or Firm* — Shumaker & Sieffert, P.A.

(57) ABSTRACT

In some examples, a system includes a memory configured to store a buffer storing volumetric weather data. The system also includes processing circuitry configured to retrieve weather radar data from the buffer by retrieving a first reflectivity value associated with a first cell of the buffer, where the first cell represents a first volume of space. The processing circuitry is further configured to determine an altitude of a first location based on a parameter and an altitude extent of the first volume of space. The altitude of the first location is lower than an altitude of a centroid of the first volume of space. The processing circuitry is also configured to associate the first reflectivity value with the first location.

20 Claims, 13 Drawing Sheets

(56) References Cited

U.S. PATENT DOCUMENTS

| | | |
|---|---|---|
| 2011/0148693 A1 | 6/2011 | Christianson |
| 2012/0212367 A1 | 8/2012 | Rowen et al. |
| 2012/0249365 A1 | 10/2012 | Christianson |
| 2018/0246200 A1 | 8/2018 | Goossen et al. |
| 2019/0113610 A1 | 4/2019 | Vacanti et al. |
| 2020/0173809 A1* | 6/2020 | Turner ................. G01C 23/005 |

OTHER PUBLICATIONS

Honeywell, "IntuVue RDR-4000," Rev. 7, Feb. 2015, 060-44492-000, accessed from http://slidepdf.com/reader/full/honeywell-rdr-4000-weather-radar-pilots-handbook, 68 pp.

* cited by examiner

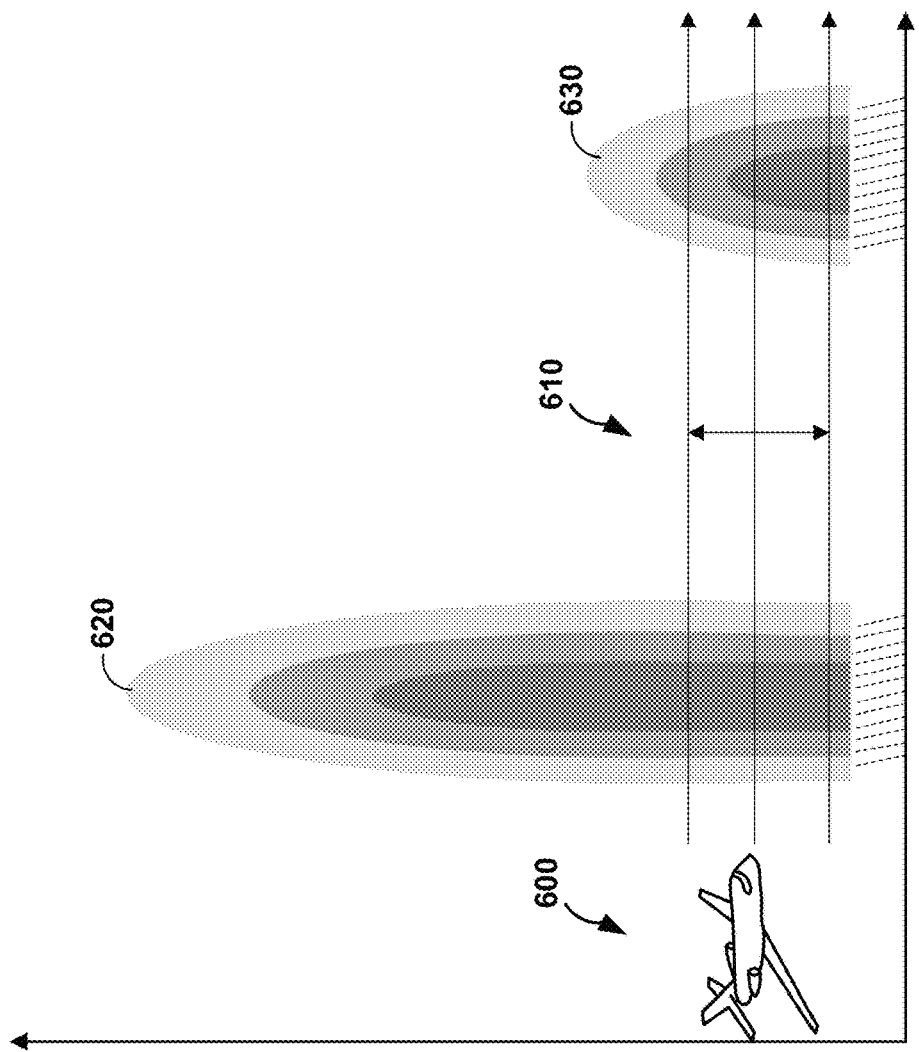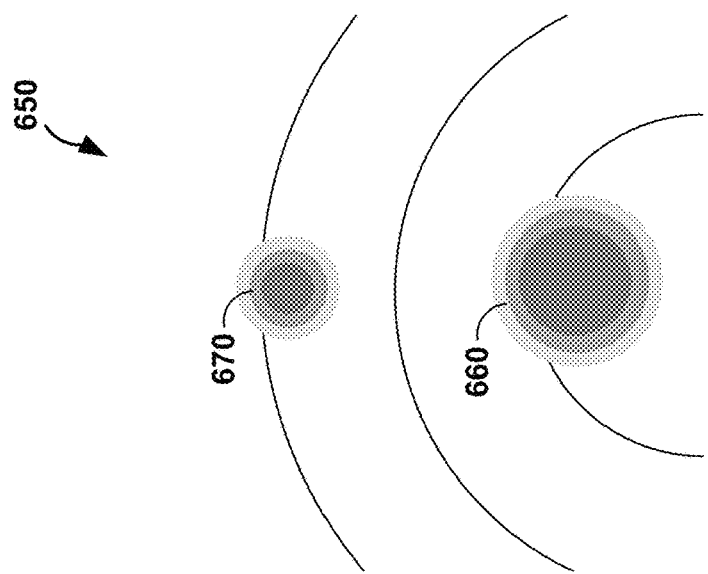
FIG. 6A
FIG. 6B

RETRIEVING WEATHER DATA FROM MEMORY

TECHNICAL FIELD

This disclosure relates to weather radar data.

BACKGROUND

A vehicle may include a weather radar system for sensing the weather conditions outside of the vehicle. For example, many aircraft include a weather radar system with an antenna on the nose of the aircraft for sensing the weather conditions in the travel path of the aircraft. The weather radar system can transmit radar signals towards an area of interest and detect weather formations in the area of interest based on the reflections of the radar signals off the weather formations. The weather radar system can store weather data indicating the sensed weather formations in a memory onboard the aircraft. The weather data may be based on the reflected radar signals and/or data received by the aircraft from external sources such as other aircraft or ground stations. The weather radar system can present the weather data to the flight crew via a display in the cockpit. The presentation of weather data allows the flight crew to plan their flight to avoid hazardous weather.

The weather radar system can store the weather data as a three-dimensional array, also known as a three-dimensional buffer. Each data point in the buffer is known as a cell or a voxel and may represent a singular point in space or a three-dimensional volume of space. Each cell in the volumetric buffer may be associated with a reflectivity value based on the amplitude of the reflected radar signals received by the weather radar system. To present the weather data via a cockpit display, the weather radar system retrieves the reflectivity values from the volumetric buffer and presents the reflectivity values via the display. The cockpit display can present a graphical user interface with red areas for high-intensity weather formations, yellow areas for medium-intensity weather formations, and green areas for low-intensity weather formations.

SUMMARY

In general, this disclosure describes systems, devices, and techniques for retrieving or extracting weather data from memory. The weather data can be stored in memory as a volumetric buffer, where each cell in the volumetric buffer represents a volume of space. Processing circuitry can retrieve a set of reflectivity values from the volumetric buffer, where each reflectivity value is associated with a cell of the volumetric buffer. The processing circuitry is configured to determine an altitude of a location based on a parameter and an altitude extent of the volume of space. The altitude of the location is lower than an altitude of a centroid of the volume of space. The processing circuitry is further configured to associate a first reflectivity value from a first cell with the location. In some examples, the processing circuitry may use an adjustable or configurable parameter to determine the altitude to assign to the first reflectivity value.

The details of one or more examples of the disclosure are set forth in the accompanying drawings and the description below. Other features, objects, and advantages will be apparent from the description, drawings, and claims.

BRIEF DESCRIPTION OF THE DRAWINGS

FIGS. 6A, 6B, 7A, 7B, 8A, and 8B are graphs and example graphical user interfaces for a vehicle traveling towards high-intensity weather formations.

DETAILED DESCRIPTION

Figure 1:
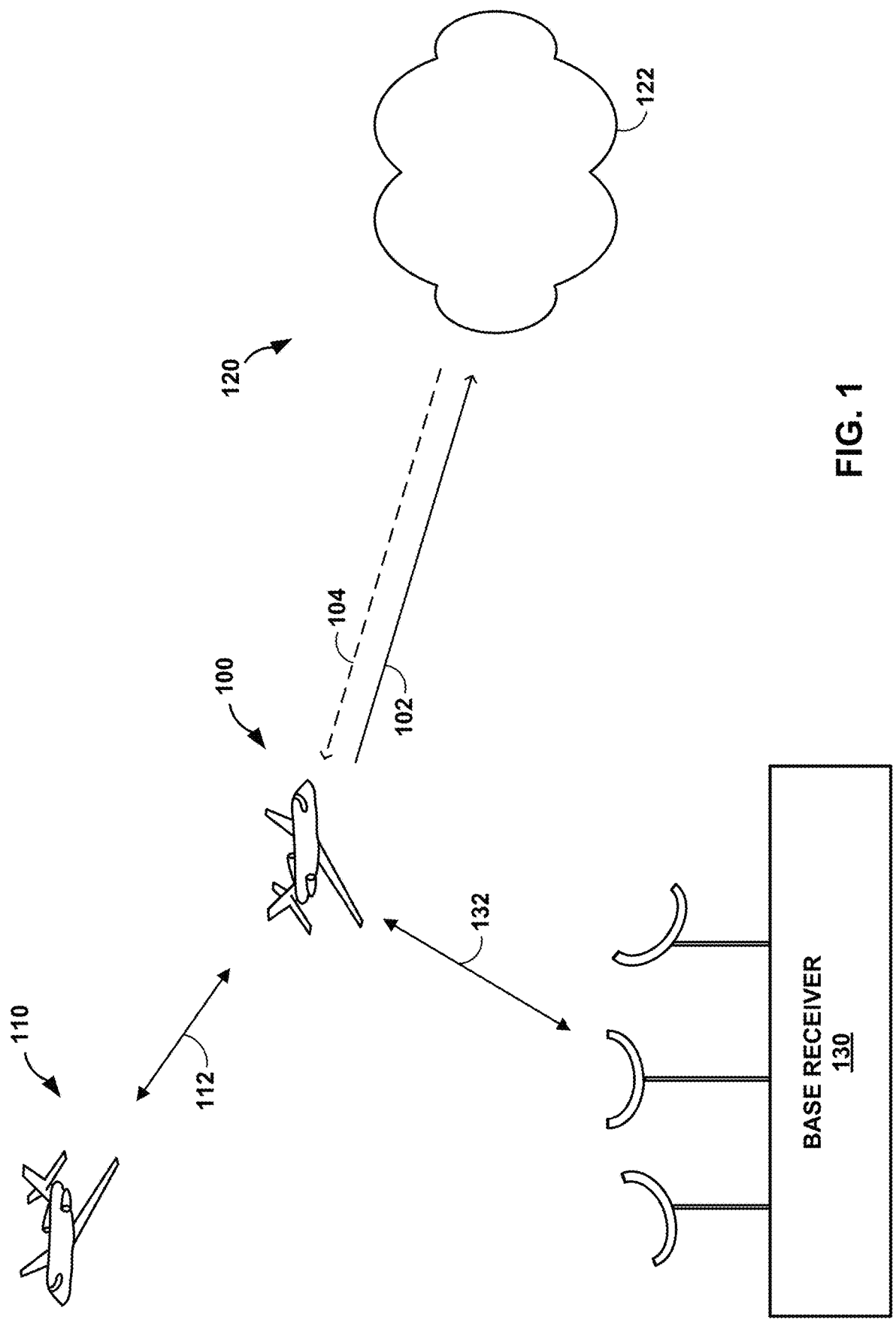
FIG. 1 is a conceptual block diagram of vehicles and a base station that can communicate weather data, in accordance with some examples of this disclosure.

Various examples of systems, devices, and techniques are described below for retrieving or extracting weather data from memory. A system of this disclosure may be configured to determine whether the weather data represents on- or off-path weather for a vehicle. The system can present on-path weather to the vehicle operator with an indication of the relevance to the vehicle, and the system can present off-path weather with an indication that the weather is outside the travel path of the vehicle.

To distinguish between on- and off-path weather, processing circuitry can determine the travel path of the vehicle. The processing circuitry may be configured to then determine whether the location associated with each weather data value (e.g., reflectivity value, turbulence value, and/or variance in reflectivity or wind) falls within or outside of the travel path. The processing circuitry can assign weather data values associated with locations within the travel path to a category for on-path weather. Likewise, the processing circuitry can assign weather data values associated with locations outside of the travel path to a category for off-path weather.

The radar beams transmitted and received by a vehicle radar may expand at longer ranges. Thus, weather data sensed by the radar at long ranges may represent relatively large volumes of space. In examples in which the lowest extent of a volume of space has inclement weather, a display system may present the inclement weather as extending through the entire volume of space, or at least up to the centroid altitude of the volume of space. As a result, automatically assigning a centroid altitude to weather can "pull up" inclement weather from the bottom of a cell into the travel path of a vehicle, even if the actual extent of the inclement weather tops out below the lower extent of a travel path of the vehicle.

In the example of an aircraft in flight, the travel path may include a horizontal span and a vertical span. The vertical span may be bounded by a threshold altitude that is lower than the altitude of the aircraft, along with an upper threshold altitude. When processing circuitry retrieves weather data for a volume of space associated with a cell, the processing circuitry may be configured to assign a specific altitude to the retrieved weather data. By assigning an altitude of a centroid of each cell, the processing circuitry may categorize weather data associated with the cell as on-path even when the reflectivity value actually represents off-path weather.

A vehicle operator may notice that the weather display presents too much weather (e.g., too much on-path weather) because weather at longer ranges is displayed as on-path before changing to off-path when the vehicle approaches. For example, the top of a storm cloud may be just below the threshold altitude for the travel path of a vehicle, such that the weather radar may store a high reflectivity value for the storm cloud in a cell that has a centroid altitude higher than the top of the storm cloud.

As just one, non-limiting example, the processing circuitry may determine that the travel path of a vehicle is above a threshold altitude of 25,000 feet. The processing circuitry may determine a reflectivity value based on radar returns from an altitude of 24,000 feet, but the processing circuitry may store the reflectivity value in a cell with a centroid at an altitude of 26,000 feet. The resolution of a radar decreases at longer ranges, so the radar may not be able to sense the weather at 26,000 feet distinctly from the weather at 24,000 feet, especially when the weather at 24,000 feet has high reflectivity. The cells at long ranges may be relatively large with a vertical extent of several thousand feet. When the processing circuitry retrieves the reflectivity value from the cell, the processing circuitry may assign an altitude of 26,000 feet to the reflectivity value, which effectively pulls up the weather from 24,000 feet to 26,000 feet. Based on the assigned altitude, the processing circuitry may incorrectly present the reflectivity value as on-path weather, rather than off-path weather. These issues may be more likely to occur at night because of the low or no visibility conditions or when over an ocean because of no ground radars to confirm the data gathered by the radar onboard the ownship vehicle.

In some examples, processing circuitry of this disclosure is configured to assign an altitude to a weather data value based on a configurable (e.g., adjustable) or predetermined parameter such that the assigned altitude is lower than an altitude of the centroid of the respective cell. The parameter may be a percentage (e.g., zero to one hundred), a factor, and/or a constant number stored in a memory that can be used by the processing circuitry to assign an altitude to each extracted weather value. By assigning an altitude lower than the centroid of the respective cell, the processing circuitry may reduce the likelihood that a weather data value that represents off-path weather will be incorrectly categorized as on-path weather.

When a vehicle operator sees on-path weather on a weather display, the operator may change the travel path to avoid the on-path weather. The avoidance maneuver may increase travel time and fuel costs, as compared to taking the original travel path. Weather displayed as on-path at a distance of sixty to one hundred and twenty nautical miles may eventually be displayed as off-path when the radar antenna is closer to the weather.

FIG. 1 is a conceptual block diagram of vehicles 100 and 110 and a base station 130 that can communicate weather data, in accordance with some examples of this disclosure. FIG. 1 depicts vehicles 100 and 110 as airplanes, but vehicles 100 and 110 may include any mobile object or remote object that receives reflectivity data for location 120. In other examples, vehicles 100 and 110 may include an aircraft such as a helicopter or a weather balloon. In yet other examples, vehicles 100 and 110 may include a land vehicle such as an automobile or a water vehicle such as a ship or a submarine.

Vehicles 100 and 110 may transmit and receive weather radar signals to collect weather data from location 120, where location 120 may represent a three-dimensional volume of space that is within range of a weather radar of vehicles 100 and/or 110. In some examples, location 120 may be identified by a point in space defined by latitude, longitude, and altitude or identified by latitude and longitude and covering all altitudes or a range of altitudes. As will be explained in greater detail below, the latitude, longitude, and altitude information may be used to define spheres, cylinders, cubes, or other three-dimensional volumes (e.g., voxels or cells) corresponding to location 120.

The weather radar onboard vehicle 100 and/or 110, as well as a radar system of base station 130, may be configured to store the weather data in a buffer including volumetric weather data. Each weather data value stored in the buffer may be associated with a cell or voxel that represents a volume of space. The weather data values may be referred to as reflectivity values or radar return values. The radar systems of vehicle 100, vehicle 110, and/or base station may be configured to retrieve weather data using the techniques of this disclosure to present the weather data via a display and/or transmit the weather data to another entity such as vehicle 100 or 110 or base station 130.

In the example of FIG. 1, base station 130 may transmit and receive requests through communication channel 132 to vehicle 100 and through other communication channels. The requests transmitted by base station 130 through communication channel 132 may include an indication of a specified location in space for which base station 130 is seeking weather data from vehicles 100 and 110.

In the example of FIG. 1, location 120 includes cloud 122. The weather radar onboard vehicle 100 may transmit radar signals 102, and cloud 122 may reflect radar signals 102 as reflected radar signals 104. The weather radar onboard vehicle 100 may be configured to perform continuous scanning of an entire volume ahead of vehicle 100. The weather radar of vehicle 100 may receive reflected radar signals 104. Reflected radar signals 104 may include return echoes from a target such as cloud 122, a water droplet, a particle, or a molecule within location 120. Vehicle 100 may process reflected radar signals 104 to determine the reflectivity for multiple data points within location 120. In some examples, vehicle 100 may be inside of or outside of location 120. Additional example details of weather radar are described in commonly assigned U.S. Patent Application Publication No. 2018/0246200, filed on Nov. 9, 2017, and entitled "Integrated Radar and ADS-B," and commonly assigned U.S. Patent Application Publication No. 2019/0113610, filed on Feb. 5, 2018, and entitled "Digital Active Phased Array Radar," the entire contents of which are incorporated herein.

Processing circuitry (e.g., one or more processors, not explicitly shown in FIG. 1) on vehicle 100 may process and analyze reflectivity data using location data for vehicle 100, including latitude, longitude, and altitude data. The processing circuitry may also receive course data for vehicle 100 from various sources such as one or more accelerometers, a compass, flight plans, and/or external sources, including direction, trajectory, and roll. The processing circuitry may use location data, course data, and return signals 104 to determine the reflectivity data for multiple data points within location 120. "Weather data" may include reflectivity data such as data relating to the moisture or particles in a volume of space. Weather data may also include data on precipitation, velocity and polarization of molecules and/or particles in space, wind speed and direction, sky cover, temperature, humidity, and the like.

As described in further detail herein, vehicle 100 can store the weather in a three-dimensional volumetric buffer of cells, which are also known as voxels. The cells of voxels each represent a volume of space, which may be rectangle-shaped or cube-shaped. The weather radar processing circuitry can assign or store a reflectivity value to each cell in the buffer. Before presenting the weather data via display or transmitting the weather data to vehicle 110 or base station 130, the processing circuitry may be configured to retrieve the weather data from memory and "flatten" the three-dimensional weather data into a two-dimensional graphical user interface. The retrieval process may include interpolating data between two neighboring cells, especially if each cell is more than one pixel away from an adjacent cell. The intermediate pixels can be filled with in values interpolated from the neighboring cells. In the process of retrieving the weather data, the processing circuitry may be configured to assign a specific location to each reflectivity value.

For example, a cell may be displayed as more than one pixel on a graphical user interface. To generate intermediate pixels between cell locations, a radar system may be configured to extrapolate the reflectivity value from the values of neighboring cells. If the radar system assigns the same value to all of the pixels within the volume represented by a cell, the resulting graphical representation would be very blocky and not representative of the real weather situation. The radar system may be configured to extrapolate a reflectivity value using values from two or more neighboring cells (e.g., a linear extrapolation). As an example, if cell A has value of 31 dBz and cell B has value of 23 dBz, pixels in between the assigned reflectivity locations of each cell will distributed (e.g., linearly) to have values between 31 and 23 dBz.

Vehicle 100 may include systems and devices for detecting the reflectivity of locations within location 120. The systems and devices within vehicle 100 may process the reflectivity data into one-, two-, or three-dimensional representations or arrays. After processing the reflectivity data, the processing circuitry on vehicle 100 may transmit data signals to base station 130. Base station 130 may include an antenna and/or a satellite dish. The systems and devices within vehicle 100 may transmit weather data to base station 130 via Aircraft Communications Addressing and Reporting System (ACARS) using a protocol standard such as Aeronautical Radio, Incorporated (ARINC), seven-hundred series. In some examples, base station 130 may be on land, on water, or in the air and may be onboard a vehicle or at a stationary location.

At longer ranges (e.g., distances from the radar antenna), the cells of the volumetric buffer are larger. In other words, at longer ranges, the cell in a volumetric buffer may represent larger vertical spans, as compared to the cell that are closer to the radar antenna. The data stored in a particular cell provides only a measure of the reflectivity value associated with the volume represented by the particular cell. However, the reflectivity value may not provide any information about the distribution of reflectivity values throughout the cell (e.g., whether reflectivity is higher in certain areas of the cell). Another radar system may assign a centroid altitude when extracting reflectivity values. In contrast, a radar system of this disclosure allows for the assigned altitude to be adjusted using a probability density function, without changing the nature or physics of the initial reflectivity measurement.

With larger cells, as compared to smaller cells, there is a higher chance that a top of a storm cloud exists near the bottom of the cell but not at the centroid of the cell. The top of the storm cloud may exist only in the bottom ten, twenty, or thirty percent of the cell, such that some of the radar returns for the volume of space represented by the cell may indicate a high reflectivity (e.g., a thunderstorm) even though there is low reflectivity at the centroid. A weather radar system may be configured to store a high reflectivity value for the cell based on the radar returns from the lower portions of the volume of space represented by the cell. When the system extracts the weather data value from the volumetric buffer (e.g., for presentation on a display), the system may assign the altitude of the centroid to the weather data value. However, assigning the altitude of the centroid may lead to an error because the system may categorize the weather data value as on-path weather, rather than accurately categorizing the weather data value as off-path weather (e.g., if the top of the storm cloud is lower than the travel path of vehicle 110).

In accordance with the techniques of this disclosure, a system onboard vehicle 110 may be configured to determine on- and off-path by assigning an altitude to each weather data value that may not be equal to the altitude of the centroid of the respective cell. The system can use a configurable and/or predetermined factor to determine the altitude for each weather data value, as opposed to using a fixed assignment method. A configurable parameter allows for a flexible assignment method because the parameter can be implemented by existing hardware with only a software upgrade. The assigned altitude may be lower than the centroid of the cell associated with the respective weather data value, which may increase the accuracy of the on- and off-path determinations, as compared to assigning the altitude of the centroid to the respective weather data value.

Although this disclosure describes techniques that can be performed by a system onboard vehicle 100, the techniques of this disclosure may also be performed by a system in base station 130, a system in vehicle 110, or any another system. For example, a system outside of vehicle 100 can determine whether each weather data value stored in a buffer represents on- or off-path weather for the travel path of vehicle 100 using the techniques of this disclosure. The outside system may be configured to then present an indication of the on- and off-path weather and/or transmit the indication to vehicle 100.

Figure 2:
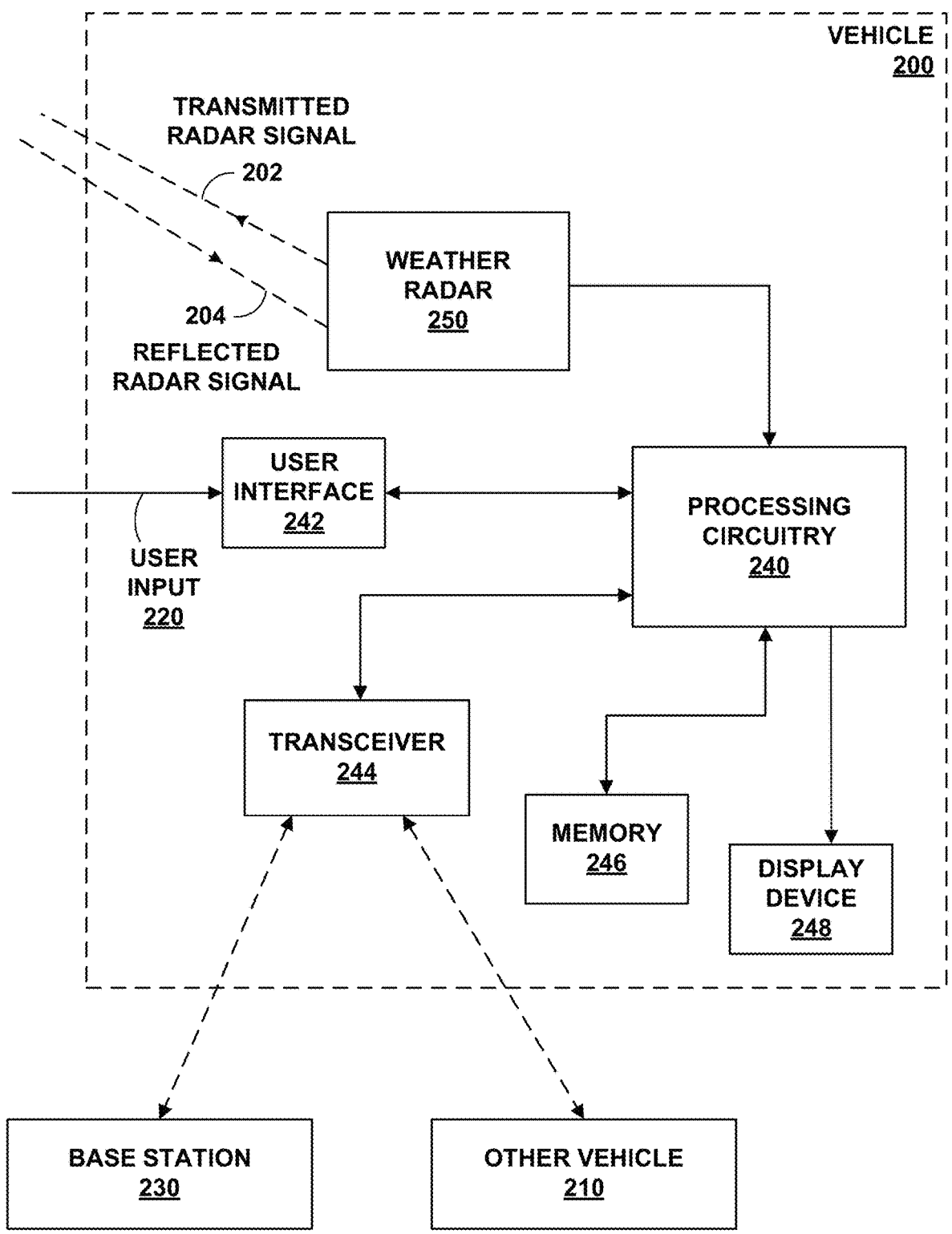
FIG. 2 is a conceptual block diagram of a system mounted on a vehicle for acquiring, storing, and retrieving weather data, in accordance with some examples of this disclosure.

FIG. 2 is a conceptual block diagram of a system mounted on a vehicle for acquiring, storing, and retrieving weather data, in accordance with some examples of this disclosure. Vehicle 200 includes processing circuitry 240 and one or more transceivers such as transceiver 244 and weather radar 250, which may include a transceiver, for collecting and transmitting weather radar data to vehicle 210 and/or base station 230. In the example of FIG. 2, vehicle 200 includes processing circuitry 240, which is communicatively coupled to user interface 242, transceiver 244, memory 246, display device 248, and weather radar 250. In some examples, vehicle 200 may correspond to one of vehicles 100 and 110 as described in FIG. 1. Additionally, for ease of understanding, weather radar 250 has been described separate from processing circuitry 240, however, processing circuitry 240 may be partially or fully included in weather radar 250 or may control any portion of weather radar 250. Transceiver 244 and weather radar 250 may be one transceiver or may include more than two transceivers in some examples.

Weather radar 250 may include a transmitter and a receiver connected to an antenna. Weather radar 250 may also include a radar control that may control the intensity and direction of transmitted signal 202 that are emitted by an antenna of weather radar 250. Weather radar 250 may include any number of processors (not shown) required to perform the functions attributed to weather radar 250. The radar control may control the transmitter of weather radar 250 to transmit transmitted signal 202 that includes a waveform and/or a pulse. Weather radar 250 can direct transmitted signal 202 towards a three-dimensional volume of space represented by one or more cells stored in a volumetric buffer in memory 246. The radar control may also control the receiver to receive return signal 204 via the antenna of weather radar 250.

Weather radar 250 receives return signal 204 from the scattering of transmitted signal 202 from the external environment including weather and terrain, which is delivered to and outputted by a receiver of weather radar 250 in a range bin to processing circuitry 240. In some examples, processing circuitry 240 may determine the signal power measurement of return signal 204 based on the waveform of return signal 204. In some examples, processing circuitry 240 may use Doppler spectral information to process the power signal measurement to estimate reflectivity values for ground and/or weather elements. In other examples, processing circuitry 240 may process the Doppler spectral information to estimate a signal power. In these examples, processing circuitry 240 may process the first signal power measurement to estimate reflectivity values for ground and/or weather elements.

Processing circuitry 240 may store reflectivity data for a three-dimensional volume of space to memory 246 in a volumetric buffer. The volumetric buffer may include a real-time weather database including an array of cells, where each cell is associated with a weather data value (e.g., a reflectivity value, turbulence value, and/or variance in reflectivity or wind). Processing circuitry 240 may be configured to continually or periodically update the weather data values stored to memory 246. The reflectivity value in each cell may represent the intensity of radar returns received by weather radar 250 from the volume of space represented by the respective cell.

For example, processing circuitry 240 and/or weather radar 250 may use beamforming techniques to determine the reflectivity value for a particular location and then store the reflectivity value to a cell that represents the particular location. In some examples, processing circuitry 240 can determine a reflectivity value for a particular location that spans across the volumes represented by two or more cells. Additional example details of transmitting weather data are described in commonly assigned U.S. Pat. No. 9,613,269, entitled "Identifying and Tracking Convective Weather Cells," issued on Apr. 4, 2017, the entire contents of which are incorporated herein by reference.

Additionally or alternatively, processing circuitry 240 may determine a reflectivity value for a volume represented by a single cell. The reflectivity value for the cell may represent the weather at the edge of the volume represented by the cell, such as a high reflectivity value associated with a storm cloud at the lowest altitudes of the volume. This occurrence may be especially common for large cells near the top of a storm cloud, where a cell represents a volume of space including the high reflectivity of the storm cloud and the lower reflectivity of the air above the storm cloud. The volumetric buffer may include cells that represent relatively large volumes at long distances from weather radar 250 because transmitted signal 202 spreads out as the distance from weather radar 250 increases.

In examples in which processing circuitry 240 determines two or more reflectivity values for a volume of space represented by a single cell, processing circuitry 240 may store only one reflectivity value to the volumetric buffer for that cell. Processing circuitry 240 may be configured to store the average reflectivity value or only the highest reflectivity value of the two or more reflectivity values. Even in examples in which processing circuitry 240 has only one reflectivity value for the volume associated with a cell, the reflectivity value may not be an accurate representation of the entire volume.

Processing circuitry 240 may output weather data by generating an image for presentation on display device 248 based on data stored in the three-dimensional volumetric buffer in memory 246. Display device 248 may be part of or separate from weather radar 250, such that weather radar 250 can generate and send an image to display device 248 for presentation. Processing circuitry 240 may also output weather data by causing user interface 242 to generate an alert based on the reflectivity data or cause display device 248 to display one or more two-dimensional representations. Transceiver 244 may be configured to transmit reflectivity data to vehicle 210 or base station 230. Additional example details of transmitting weather data are described in commonly assigned U.S. Pat. No. 9,967,707, entitled "Weather Data Dissemination," issued on May 8, 2018, U.S. Pat. No. 10,215,840, entitled "Thresholds for Transmitting Weather Data," issued on Aug. 6, 2019, and U.S. Pat. No. 10,371,793, entitled "Transmission of Weather Radar Data," issued on Aug. 6, 2019, the entire contents of which are incorporated herein by reference.

To output the weather data, processing circuitry 240 can retrieve or extract the weather data values from the volumetric buffer. As processing circuitry 240 retrieves the weather data values, processing circuitry 240 may be configured to categorize each value as on-path or off-path. On-path weather does not necessarily mean that the weather is in the direct path or likely path of vehicle 200. "On-path weather" may be any whether within a path of preset dimensions within which vehicle 200 is expected to travel. For example, even if vehicle 200 has a clearly defined expected path, processing circuitry 240 can use a travel path with a preset height of, for example, eight thousand feet centered on the expected path.

To make the determination of the on-path weather, processing circuitry 240 can assign an altitude to each retrieved value and determine whether the assigned altitude falls within the altitude extent for the travel path of vehicle 200. In accordance with the techniques of this disclosure, processing circuitry 240 may be configured to assign an altitude that is lower than the centroid altitude of the cell associated with the value. In some examples, processing circuitry 240 can assign an altitude based on a configurable (e.g., adjustable) parameter, where processing circuitry 240 is configured to determine the configurable factor based on user input 220 or based on a command received from vehicle 210 or base station 230. A value for user input 220 may be received at the time of manufacture of a system including processing circuitry 240 and user interface 242. Additionally or alternatively, the value for user input 220 may be received as part of a software or firewall update or during normal operation. The user can be an operator or crewmember of vehicle 200, a programmer, and/or a manufacturer.

In some examples, processing circuitry 240 is configured to determine the configurable parameter based on the ambient temperature. For example, at higher temperatures, processing circuitry 240 may assign an altitude that is closer to the centroid altitude of a cell, as compared to the assigned altitude at lower temperatures. Processing circuitry 240 may determine a configurable parameter that causes higher assigned altitudes at higher temperatures. During summertime, for example, higher temperatures may result in higher energy in the storms and air masses.

Processing circuitry 240 may be configured to assign a location to each reflectivity value retrieved from memory 246. The assigned location may include an absolute location (latitude, longitude, and altitude) and/or a relative location (e.g., relative to vehicle 200). Processing circuitry 240 may also be configured to determine a travel path for vehicle 200, where the travel path includes a volume of space through which vehicle 200 is expected to travel. Processing circuitry 240 can categorize reflectivity values as on- or off-path weather by determining whether each reflectivity value is within or outside the travel path of vehicle 200. This determination may include determining whether the altitude to assigned to each reflectivity value is above or below a threshold altitude that represents the lower bound of the travel path of vehicle 200.

Figure 3:
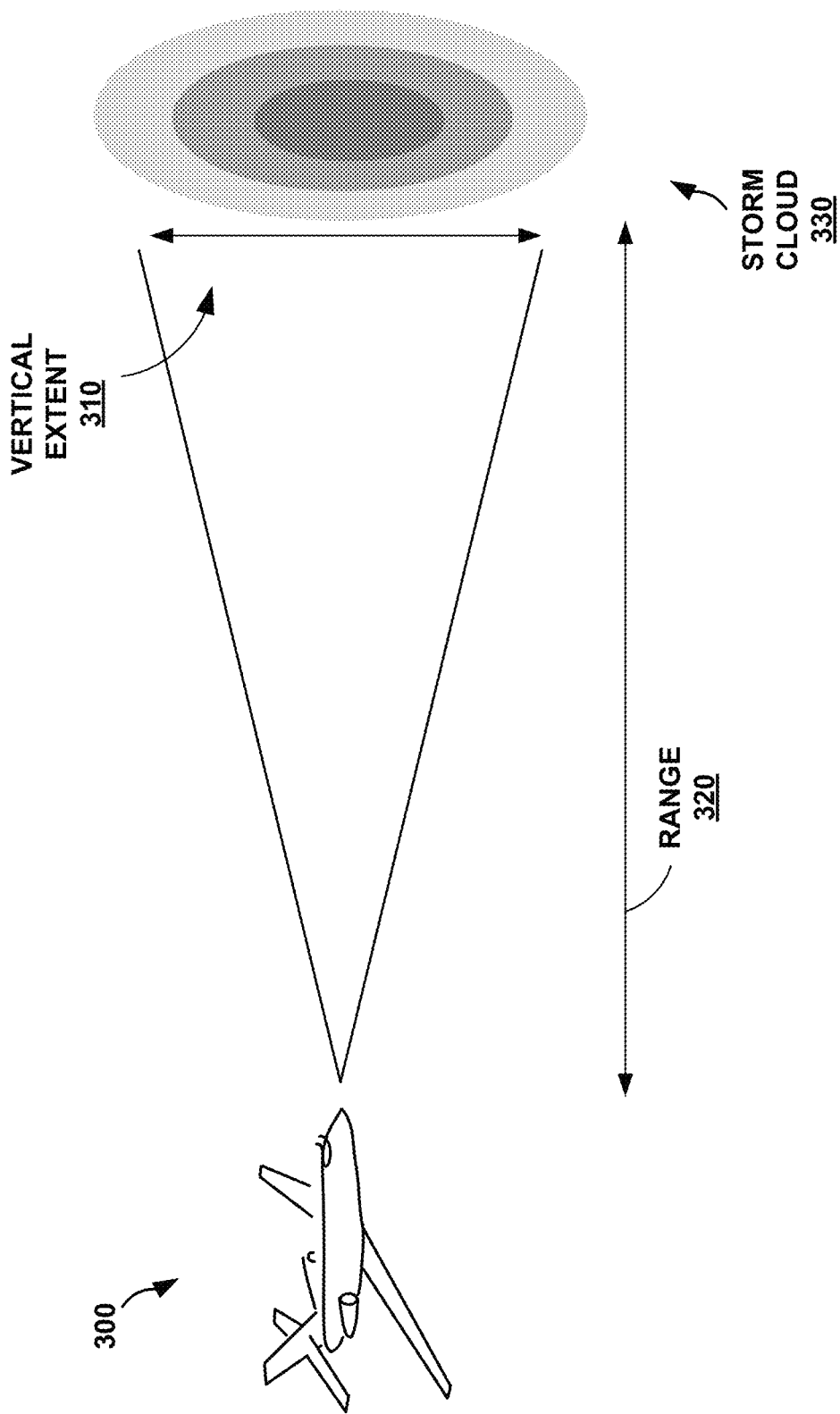
FIG. 3 is a diagram showing that antenna beamwidth increases with range.

FIG. 3 is a diagram showing that antenna beamwidth increases with range 320. A weather radar system onboard vehicle 300 can transmit radar signals and receive reflections of the transmitted radar signals. At range 320, the antenna beamwidth has vertical extent 310. FIG. 3 also shows storm cloud 330 with three areas of differing reflectivity intensities: a central area of high reflectivity, an intermediate area of moderate reflectivity, and an outer area of lower reflectivity.

The antenna beamwidth, which may be approximately 3.3 degrees, can result in a wider on-path envelope at longer ranges. The on-path envelope widens because of the growing radar beam size (e.g., lower angular resolution at longer ranges). Therefore, the weather radar may have fewer cells at longer ranges because of the lower resolution. At longer ranges, the weather radar system may measure reflectivity from ground level up to sixty thousand feet mean sea level. Table I lists the vertical antenna beam extent in feet at various ranges for a thirty-inch antenna and a three-degree beamwidth.

TABLE I

Beam extent in feet for range in nautical miles.

| Range (nm) | Extent (ft) |
|---|---|
| 10 | 3,000 |
| 20 | 6,100 |
| 30 | 9,100 |
| 50 | 15,200 |
| 80 | 24,200 |
| 100 | 30,300 |
| 150 | 45,500 |
| 200 | 60,600 |
| 300 | 90,900 |

Figure 4A:
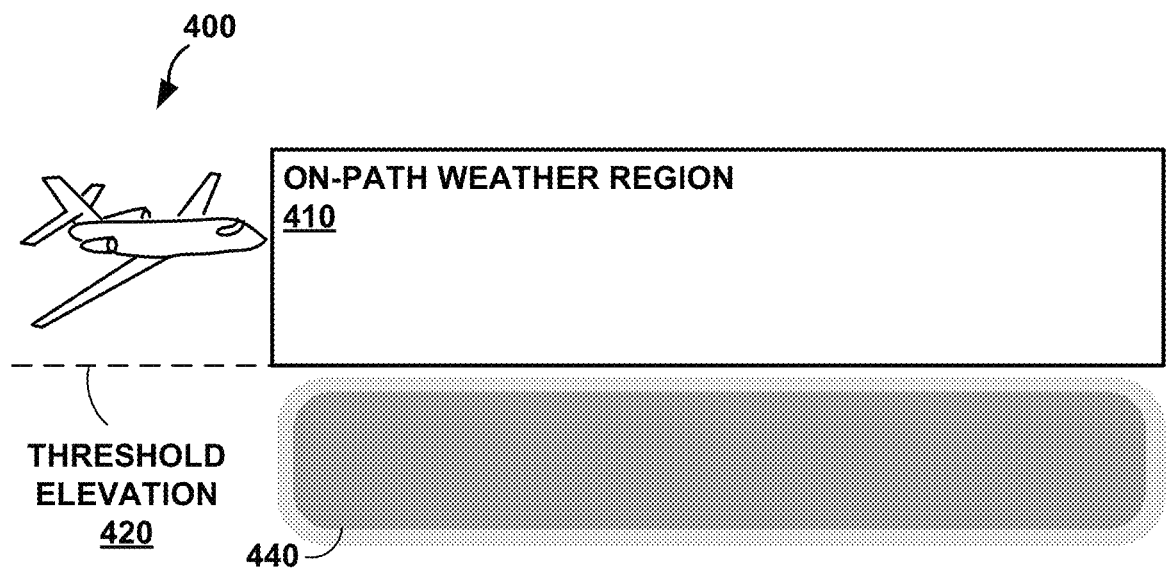
FIGS. 4A and 4B are diagrams showing the effects of a widening radar beam.
Figure 4B:
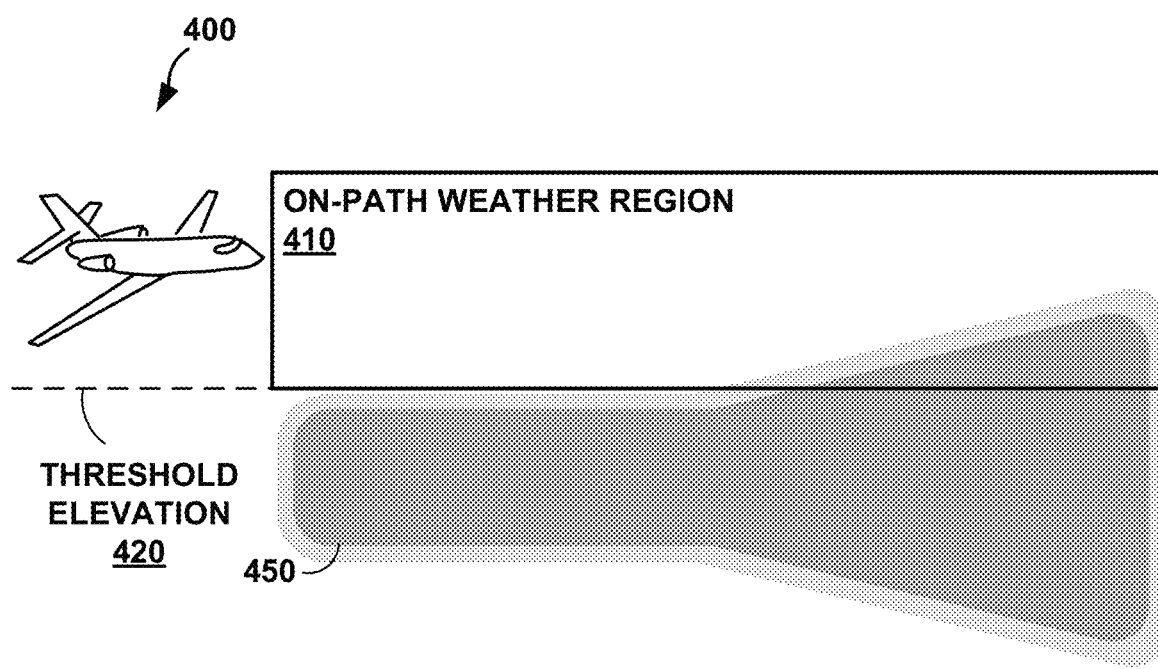

FIGS. 4A and 4B are diagrams showing the effects of a widening radar beam. FIG. 4A shows the true reflectivity in the example of stratus cloud 440. In the example shown in FIG. 4A, storm cloud 440 is below threshold altitude 420, which is the lower boundary of on-path weather region 410. Stratiform weather often has tops in the twenty to twenty-five thousand foot range. At longer ranges, the radar returns can be blurred across one or more cells, which can result in the expansion of the storm tops. Thus, a weather radar may assign an altitude to the storm top that does not match the pilot observation or the actual altitude of the storm top.

Threshold altitude 420 may be determined based on the altitude of vehicle 400 and the velocity of vehicle 400 (e.g., the vertical velocity of vehicle 400). A system of this disclosure may be configured to determine threshold altitude by subtracting a predetermined or predefined distance (e.g., an amount or altitude) from the altitude of vehicle 400. In some examples, threshold altitude 420 may be two, three, four, or five thousand feet below the altitude of vehicle 400, where the predetermined distance is two, three, four, or five thousand feet. For example, the nominal travel path weather envelope may be plus/minus four thousand feet with respect to the expected travel path. At cruise altitudes above 29,000 feet, threshold altitude 420 may be set to 25,000 feet to include relevant convective activity. On the ground and during departure or approach, the threshold ceiling altitude may be set at ten thousand feet. These threshold altitude provide approximately ten minutes of look-ahead for the vehicle operator.

FIG. 4B shows the apparent reflectivity in the example of stratus cloud 450, which appears to extend higher than threshold altitude 420. The weather radar onboard vehicle 400 transmits radar signals with a vertical beam extent that increases with range. Thus, the apparent vertical extent of the distant stratiform (non-convective) weather is exaggerated and can push into on-path weather region 410. The top of cloud 450 may appear to be above threshold altitude 420 at longer distances from vehicle 400 due to the expanding beamwidth and larger cells at long ranges.

Figure 5:
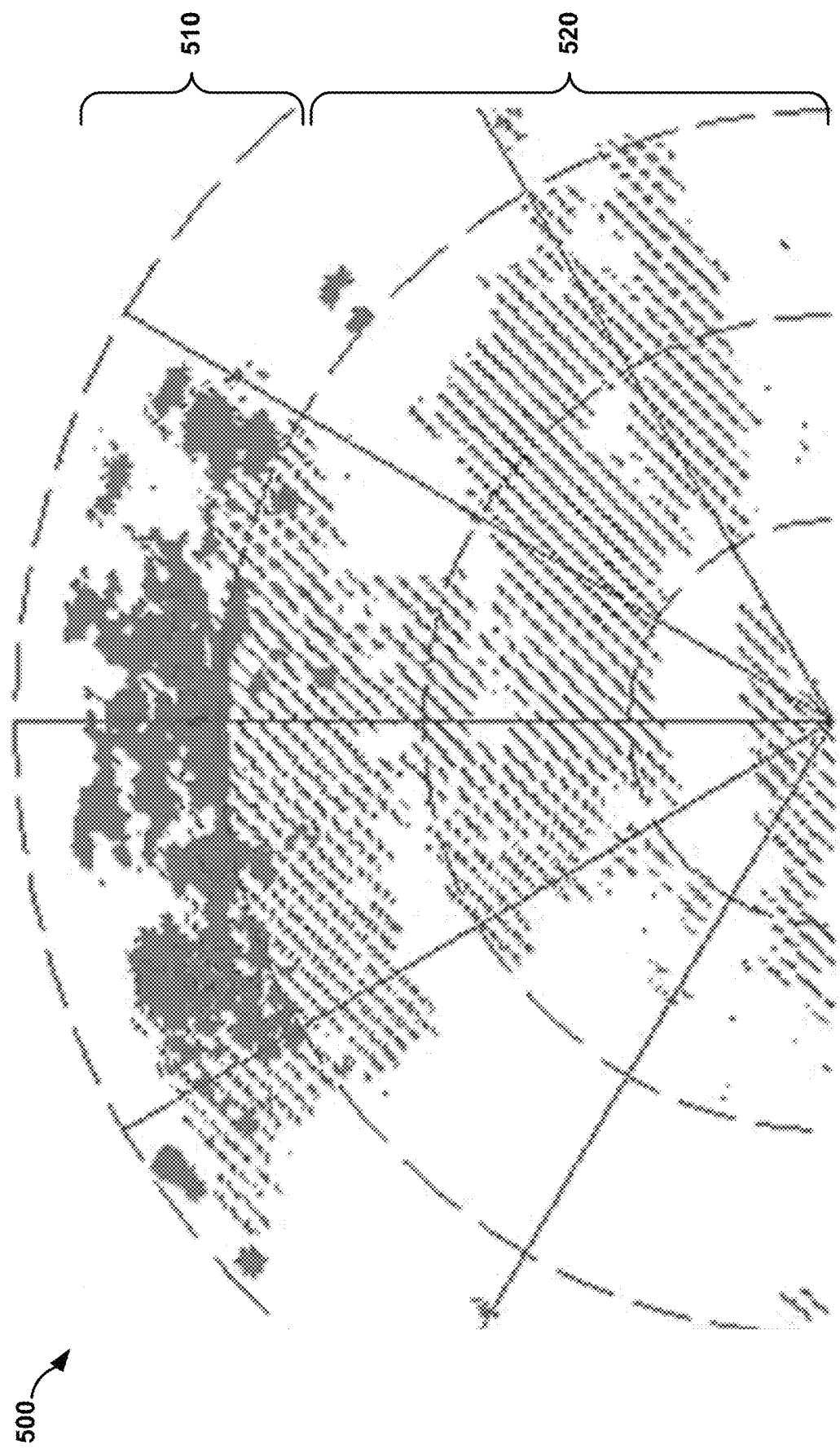
FIG. 5 is an example graphical user interface with graphical representations of weather data presented on a display.

FIG. 5 is an example graphical user interface 500 with graphical representations 510 and 520 of weather data presented on a display. Graphical representation 510 has a darker shade than graphical representation 520. The darker shade of graphical representation 510 indicates higher reflectivity values than the reflectivity values indicated by graphical representation 520. Graphical user interface 500 includes the darker shades of graphical representation 510 at longer ranges, possibly due to using the centroid altitude of the cells of the volumetric buffer. The storm tops are exaggerated at longer ranges, possibly causing vehicle operators to travel conservative paths around the weather presented as on-path, resulting in excess fuel burn and time delays. Using a centroid approach can push up the appearance of storm clouds in graphical representation 510 at longer ranges.

Figure 7B:
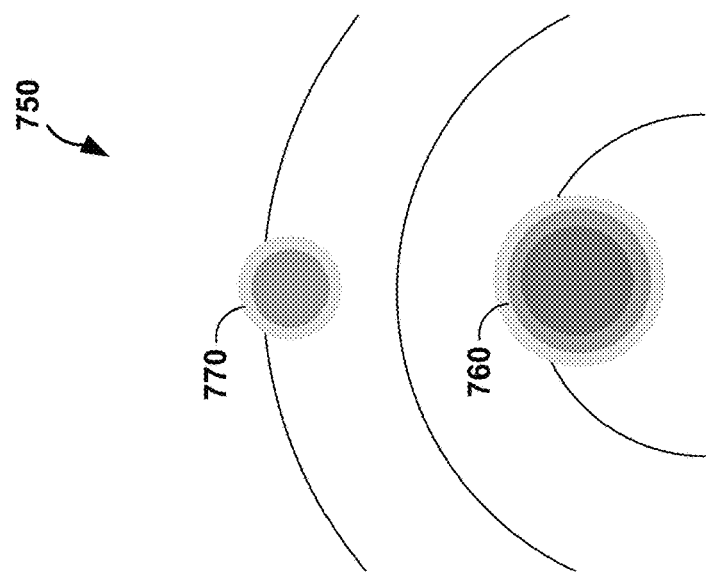
Figure 7A:
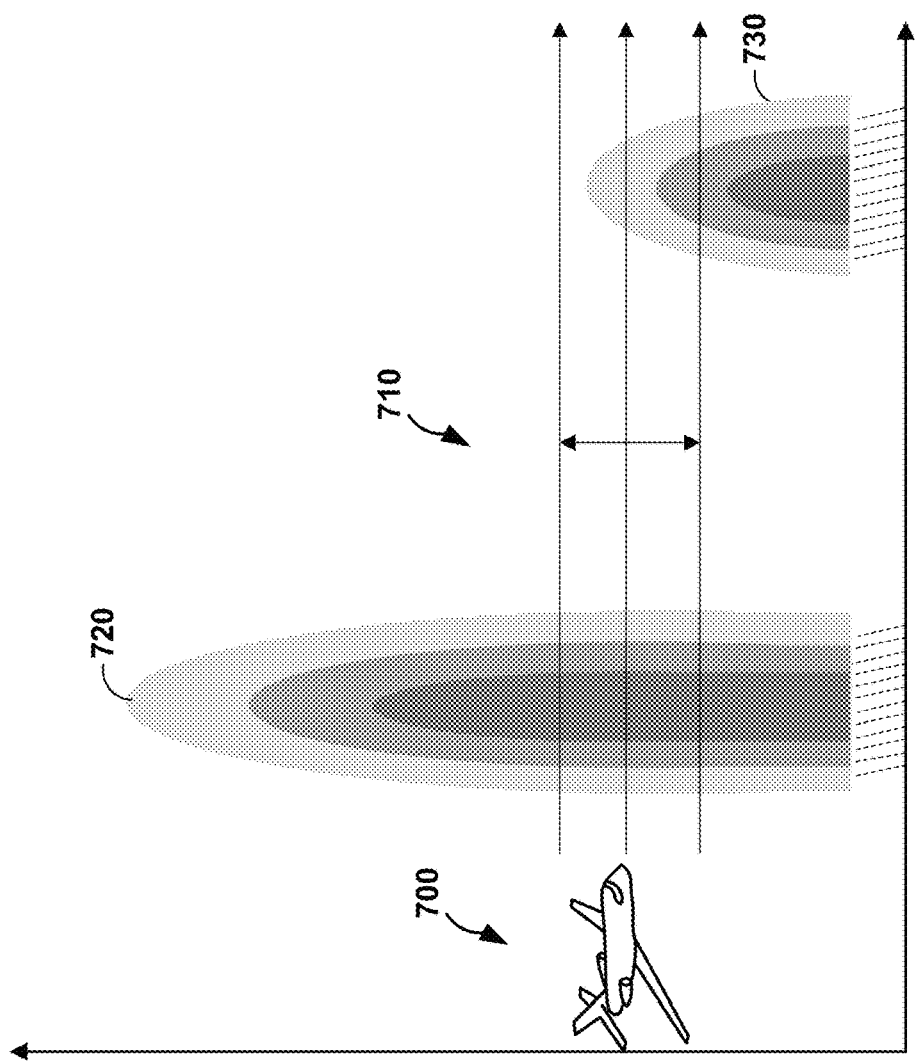
Figure 8B:
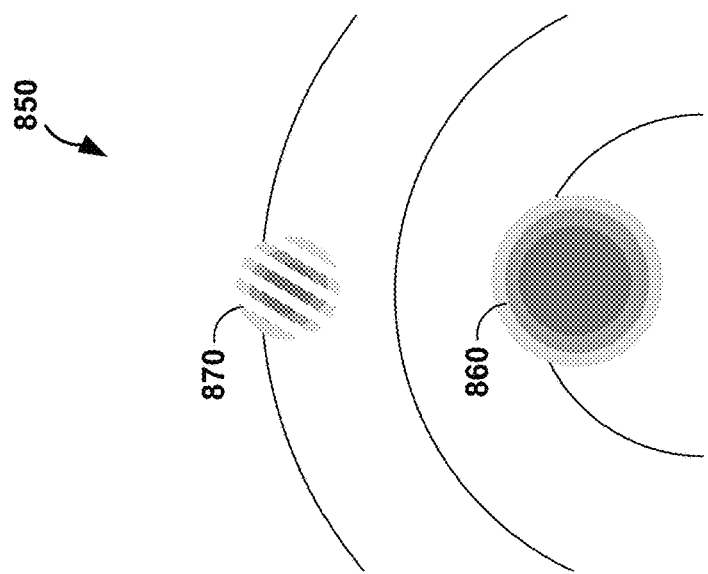

FIGS. 6A, 6B, 7A, 7B, 8A, and 8B are diagrams and example graphical user interfaces for a vehicle traveling towards high-intensity weather formations. FIGS. 6B, 7B, and 8B are example plan-view graphical user interfaces. FIG. 6A shows a side-view diagram of travel path 610 of vehicle 600 through storms 620 and 630. FIG. 6B shows graphical user interface 650 including graphical representations 660 and 670 for storms 620 and 630. Processing circuitry may be configured to present graphical representations 660 and 670 using solid colors because the high-reflectivity regions of storms 620 and 630 at least partially overlap with travel path 610.

FIG. 7A shows a side-view diagram of the travel path of vehicle 700 through storms 720 and 730. FIG. 7B shows graphical user interface 750 including graphical representations 760 and 770 for storms 720 and 730. Graphical user interface 750 is different than graphical user interface 650 because travel path 710 of vehicle 700 does not pass through the highest-reflectivity portion of storm 730.

Figure 8A:
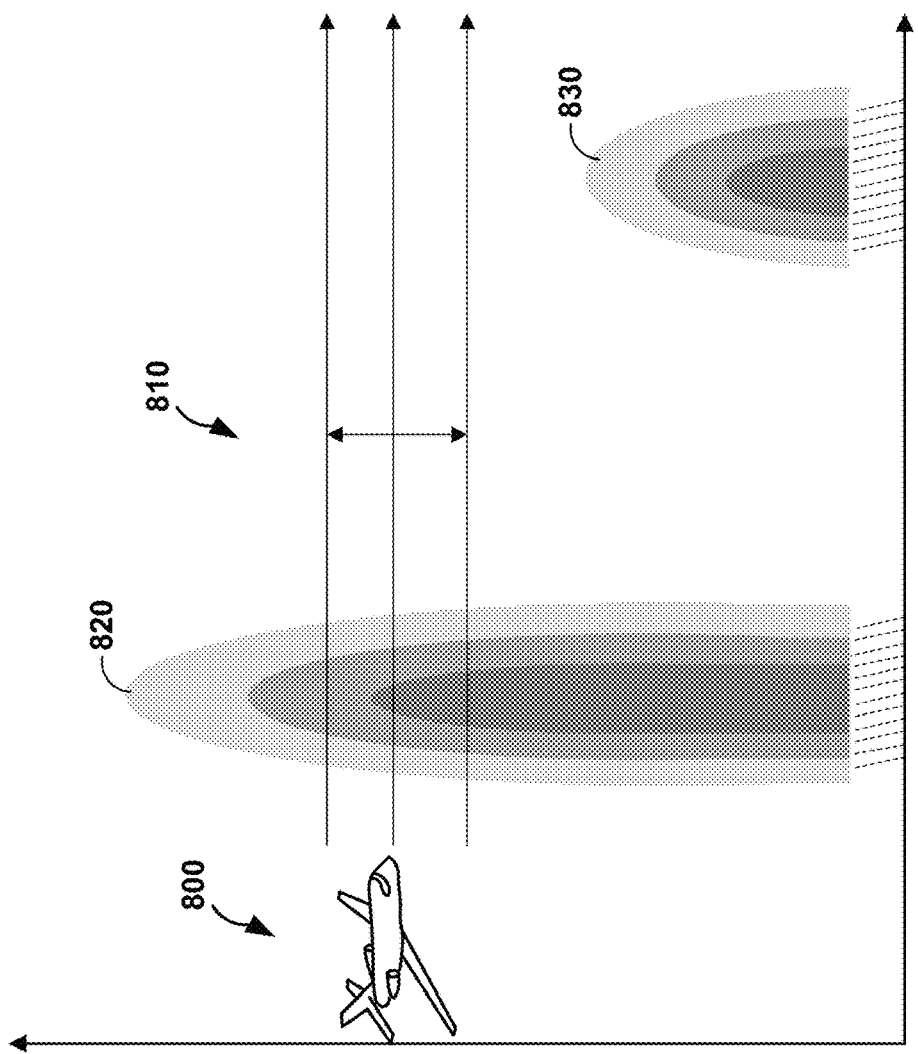

FIG. 8A shows a side-view diagram of travel path 810 of vehicle 800 through storm 820 and over the top of storm 830. FIG. 8B shows graphical user interface 850 including graphical representations 860 and 870 for storms 820 and

830. Storm 830 does not overlap with travel path 810, so the processing circuitry may be configured to present graphical representation 870 with stripes that are translucent or the same color as the background of graphical user interface 850. Graphical representation 870 can be presented with stripes that are the same color as the background of graphical user interface 850.

A system of this disclosure may determine travel paths 610, 710, and 810 using threshold altitudes that are four thousand feet above and below the expected path of vehicles 600, 700, and 800. When the altitude or expected path of a vehicle is greater than 29,000 feet, the lower threshold altitude may be set to 25,000 feet. When the altitude or expected path of a vehicle is less than 6,000 feet, the upper threshold altitude may be set to 10,000 feet.

Figure 9A:
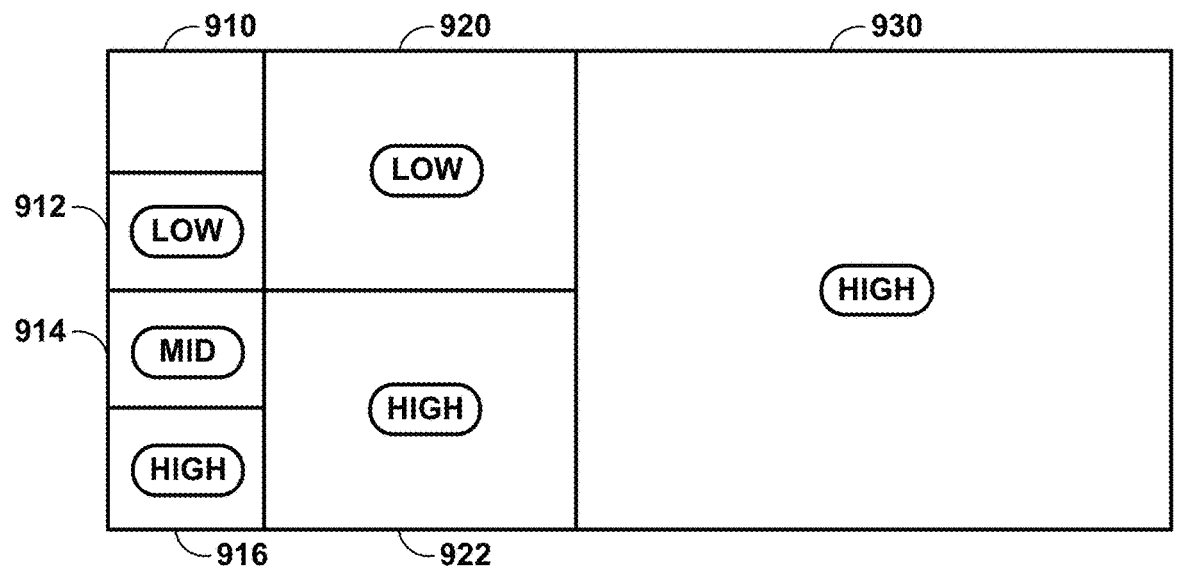
FIGS. 9A and 9B are conceptual block diagrams of a model and example extraction diagram using a centroid approach.
Figure 9B:
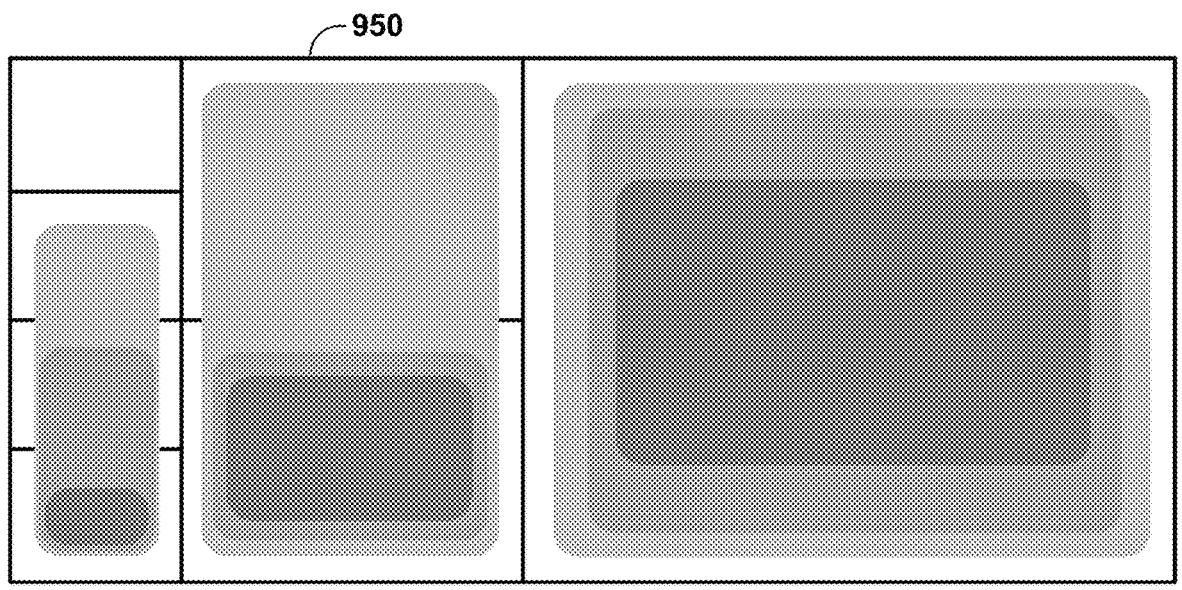

FIGS. 9A and 9B are conceptual block diagrams of a model 900 and example altitude assignment table 950 using a centroid approach. In model 900, there are seven cells including cells 910, 912, 914, and 916 at a close range, cells 920 and 922 at a moderate range, and cell 930 at a long range. Cells 910, 912, 914, and 916 at a close range have a relatively small size, cells 920 and 922 at a moderate range have a moderate size, and cell 930 at a long range have a relatively large size. With increasing range (e.g., moving from cell 910 to cell 930), the cells represent increasingly large volumes. The three-dimensional cells are bigger at longer range by design, which correlates with increased radar beam extent. For example, cell 910 may span an altitude extent range of one thousand feet, cell 920 may span an altitude extent of two thousand feet, and cell 930 may span an altitude extent of three or four thousand feet.

The lowest-altitude cells 916, 922, and 930 contain high reflectivity values. The higher-altitude cell 914 contains a moderate reflectivity value. Cells 912 and 920 contain low reflectivity values, and cell 910 contains no reflectivity value. When processing circuitry extracts the reflectivity values from a volumetric buffer, the processing circuitry may be configured to assign an altitude to each reflectivity value. Altitude assignment table 950 shows an example centroid approach. For example, the processing circuitry may be configured to assign a centroid altitude of cell 916 to the high reflectivity value extracted from cell 916. The extraction technique depicted in altitude assignment table 950 associates the centroid altitude of the cell with the reflectivity value for the cell as determined from the radar returns.

Figure 10A:
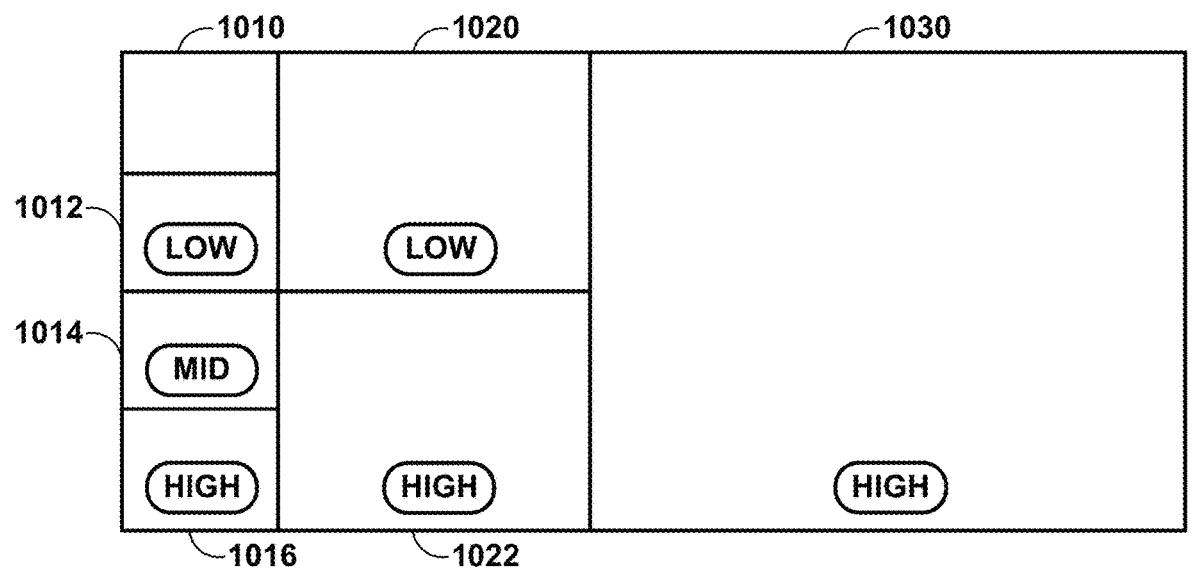
FIGS. 10A and 10B are conceptual block diagrams of a model and example extraction diagram using a lower-than-centroid approach, in accordance with some examples of this disclosure.
Figure 10B:
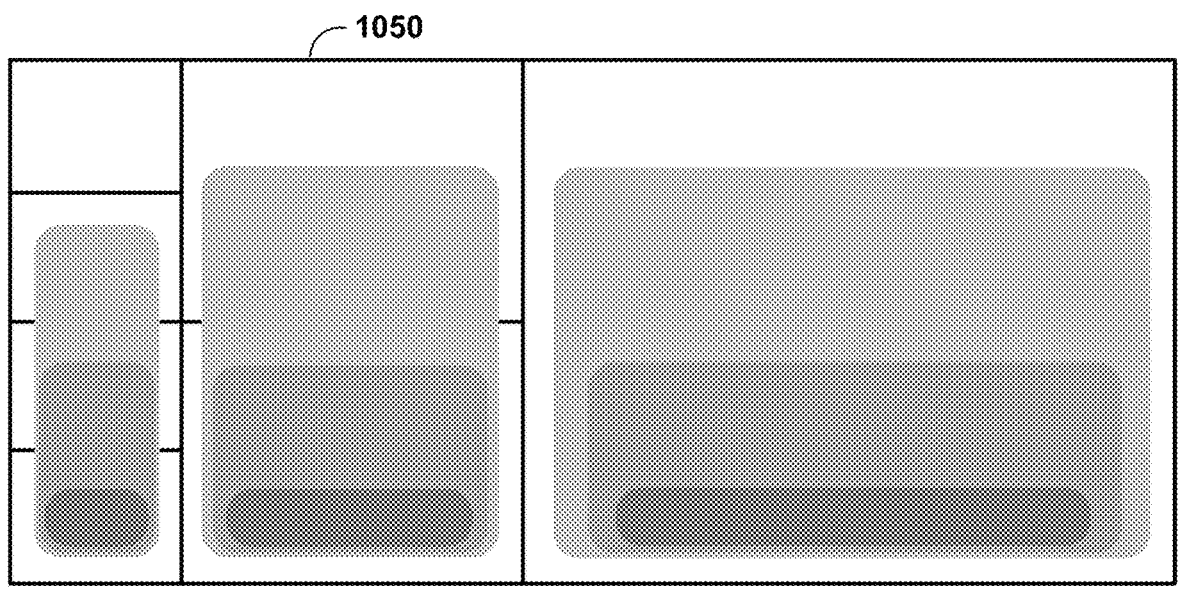

FIGS. 10A and 10B are conceptual block diagrams of a model 1000 and example altitude assignment table 1050 using a lower-than-centroid approach, in accordance with some examples of this disclosure. Altitude assignment table 1050 allows for adjustable distribution within the respective cell. For example, processing circuitry can determine a configurable parameter based on user input. The configurable parameter may define an assigned altitude as the lowest altitude in the cell (e.g., the altitude of the lower boundary of the cell) or as an altitude percentage (e.g., a percentile altitude) of the cell. The configurable altitude could define an assigned altitude as an altitude that is ten, twenty, thirty, or any other percent above the lowest altitude of the cell. For a cell with a vertical extent of one thousand feet, the processing circuitry can use a configurable parameter of ten percent to assign an altitude that is one hundred feet above the lowest altitude of the cell.

The default value of the configurable parameter may be zero, ten, or twenty percent, where zero percent is associated with the lowest altitude of the cell. By assigning the lowest altitude of the cell to the reflectivity value, the weather data may be pushed down by as much as half of the height of the buffer cell, as compared to an approach that assigns a centroid altitude to the reflectivity value. Assigning the lowest altitude may better match the retrieved reflectivity values to the observed weather.

A system of this disclosure may be configured to determine an altitude to assign to a reflectivity value based on the altitude percentage and an altitude extent of a volume of space for the respective cell. For example, the system may multiply the altitude percentage and the altitude extent, add the product and the lowest altitude of the cell, and assign the sum to the reflectivity value, as shown in Equations (1) and (2). The altitude extent of a cell is the difference between the maximum altitude of the cell and the minimum altitude, as shown in Equation (1). The system can assign an altitude that is above the minimum altitude by the product of the altitude percentage and the altitude extent, as shown in Equation (2).

$$\text{Altitude Extent} = \text{Maximum Altitude} - \text{Minimum Altitude} \tag{1}$$

$$\text{Assigned Altitude} = (\text{Altitude Percentage} \times \text{Altitude Extent}) + \text{Minimum Altitude} \tag{2}$$

Cells 1016, 1022, and 1030 are associated with high reflectivity values, which a weather radar system may have determined based on radar returns from the low altitudes within each respective cell. For example, the top of a storm cloud may exist in the lowest ten or twenty percent of the cell, causing radar returns from that region to indicate high reflectivity, even if most of the cell does not have high reflectivity. By presenting a reflectivity value at the bottom of a respective cell, a system can have better correlation between the presented weather and the real weather observations.

Altitude assignment tables 950 and 1050 are examples of possible vertical profile graphical user interfaces. Altitude assignment tables 950 and 1050 can provide a side-view illustration of the vertical extent of storm clouds. Altitude assignment table 1050 shows less inclement weather at higher altitudes, as compared to altitude assignment table 950. In some examples, altitude assignment table 1050 may be a more accurate representation of the vertical profile of the weather data shown in FIGS. 9A and 10A than altitude assignment table 950.

The assigned altitude operates as an adjusted measured center of the reflectivity within the cell. The process of retrieving weather data may further include interpolating between the assigned centers/locations of the cells to determine the weather at other points. For example, if each cell is represented by multiple pixels, the radar system can interpolate the pixel values between cells. The assigned altitude may depend on controlled inputs such as static air temperature or other aircraft- or airline-controlled configurable inputs.

Figure 11:
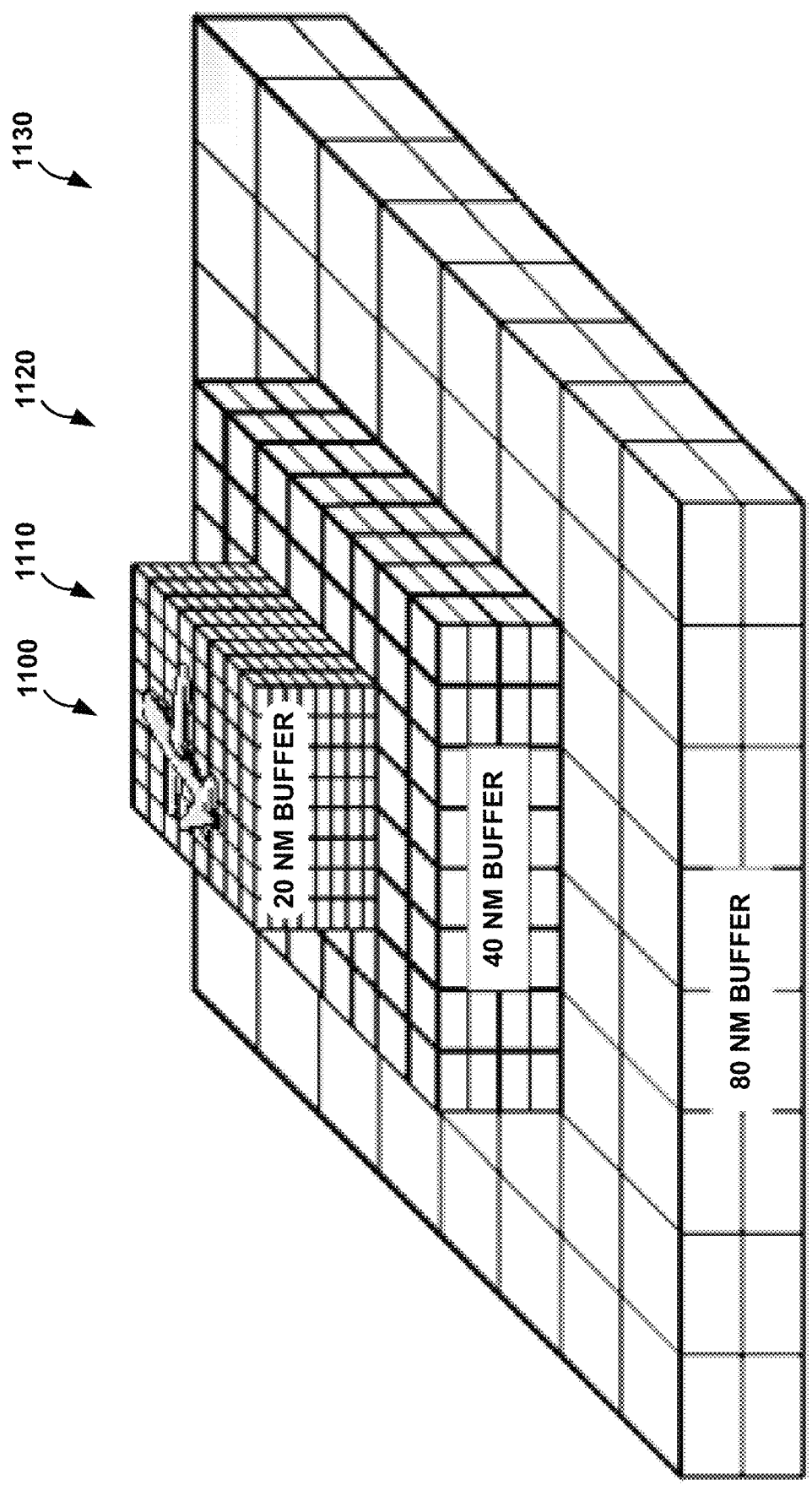
FIG. 11 is a conceptual block diagram illustrating a volumetric buffer.

FIG. 11 is a conceptual block diagram illustrating a volumetric buffer. FIG. 11 shows buffers 1110, 1120, and 1130 underneath vehicle 1100, but the weather radar onboard vehicle 1100 may be configured to scan the volume ahead of vehicle 1100. The volumetric buffer shown in FIG. 11 includes buffer 1110 that is less than twenty nautical miles from vehicle 1100, buffer 1120 that is between twenty and forty nautical miles from vehicle 1100, and buffer 1130 that is between forty and eighty nautical miles from vehicle 1100. The cells in buffer 1130 are larger than the cells in buffer 1120, which are larger than the cells in buffer 1110.

Table I shows example dimension for cells at five different ranges out to a maximum range of three hundred and twenty nautical miles.

TABLE I

Example buffer cell sizes.

| Maximum range (nm) | Number of cells per horizontal layer | Dimensions of each cell (nm × nm) | Number of vertical layers | Voxel height (feet) |
|---|---|---|---|---|
| 20 | 128 × 128 | 0.3125 × 0.3125 | 32 | 1875 |
| 40 | 128 × 128 | 0.625 × 0.625 | 16 | 3750 |
| 80 | 128 × 128 | 1.25 × 1.25 | 8 | 7500 |
| 160 | 128 × 128 | 2.5 × 2.5 | 4 | 15000 |
| 320 | 128 × 128 | 5 × 5 | 2 | 30000 |

In some examples, the cells in the volumetric buffer may be curved to match the surface of the earth. Additional example details of volumetric buffers are described in commonly assigned U.S. Pat. No. 6,667,710, entitled "3-D Weather Buffer Display System," issued on Dec. 23, 2003, U.S. Pat. No. 6,720,906, entitled "Constant Altitude Weather and All Weather Display," issued on Apr. 13, 2004, and U.S. Pat. No. 6,839,018, entitled "Vertical Profile Display with Arbitrary Plane," issued on Jan. 4, 2005, the entire contents of which are incorporated herein by reference.

The insertion process (e.g., the measurements made by the radar) is limited by the size of the radar beam. The radar may be capable of detecting that there is a power return coming from an area associated with a cell. However, the radar may not be capable of detecting exactly where in the cell the reflected radar signals are coming from. Therefore, the assumption that the radar returns are coming from the center of the cell may not be accurate. This disclosure describes techniques for assigning an altitude other than the centroid altitude to an extracted weather data value.

Figure 12:
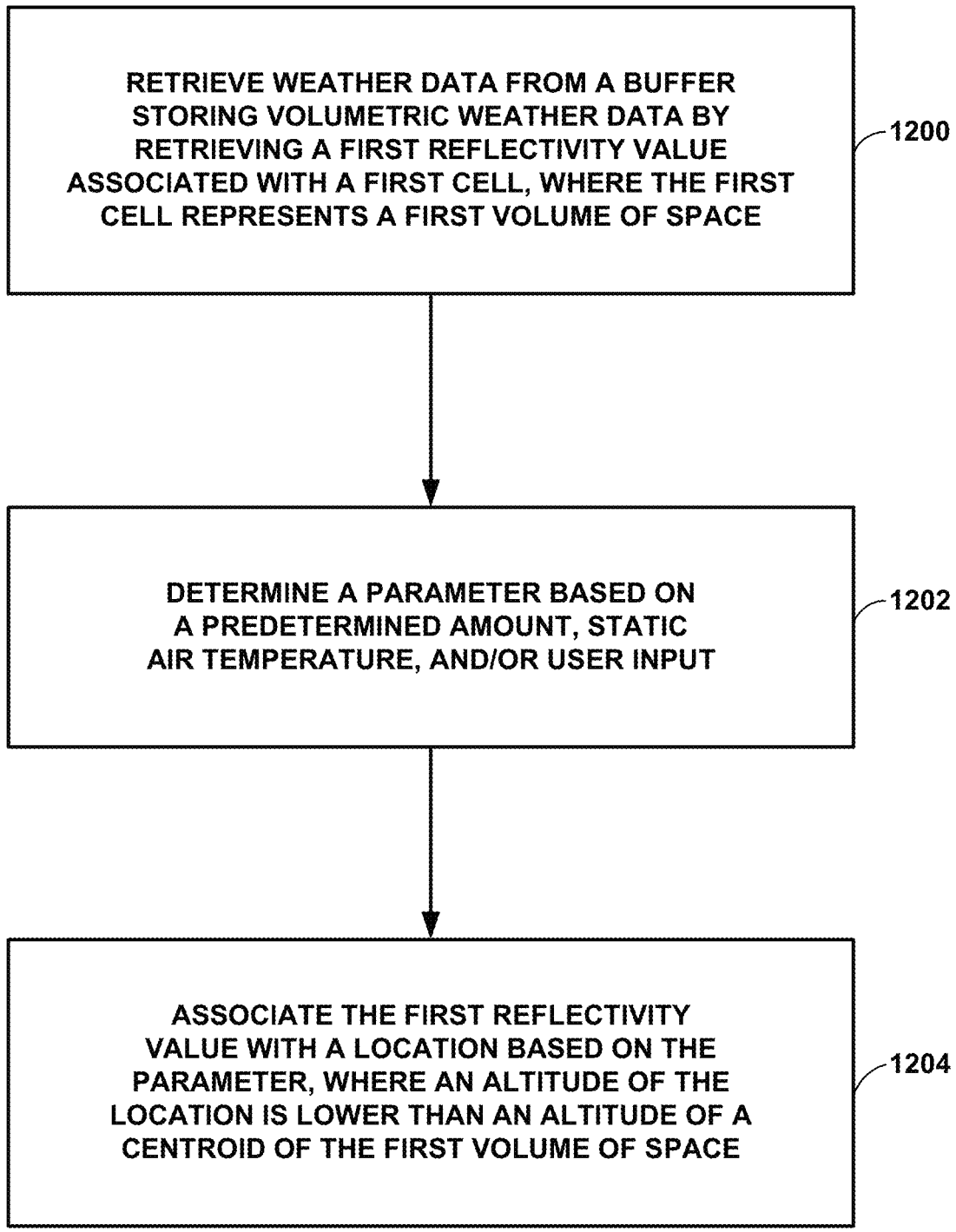
FIGS. 12 and 13 are flowcharts illustrating example processes for retrieving weather data from a volumetric buffer, in accordance with some examples of this disclosure.
Figure 13:
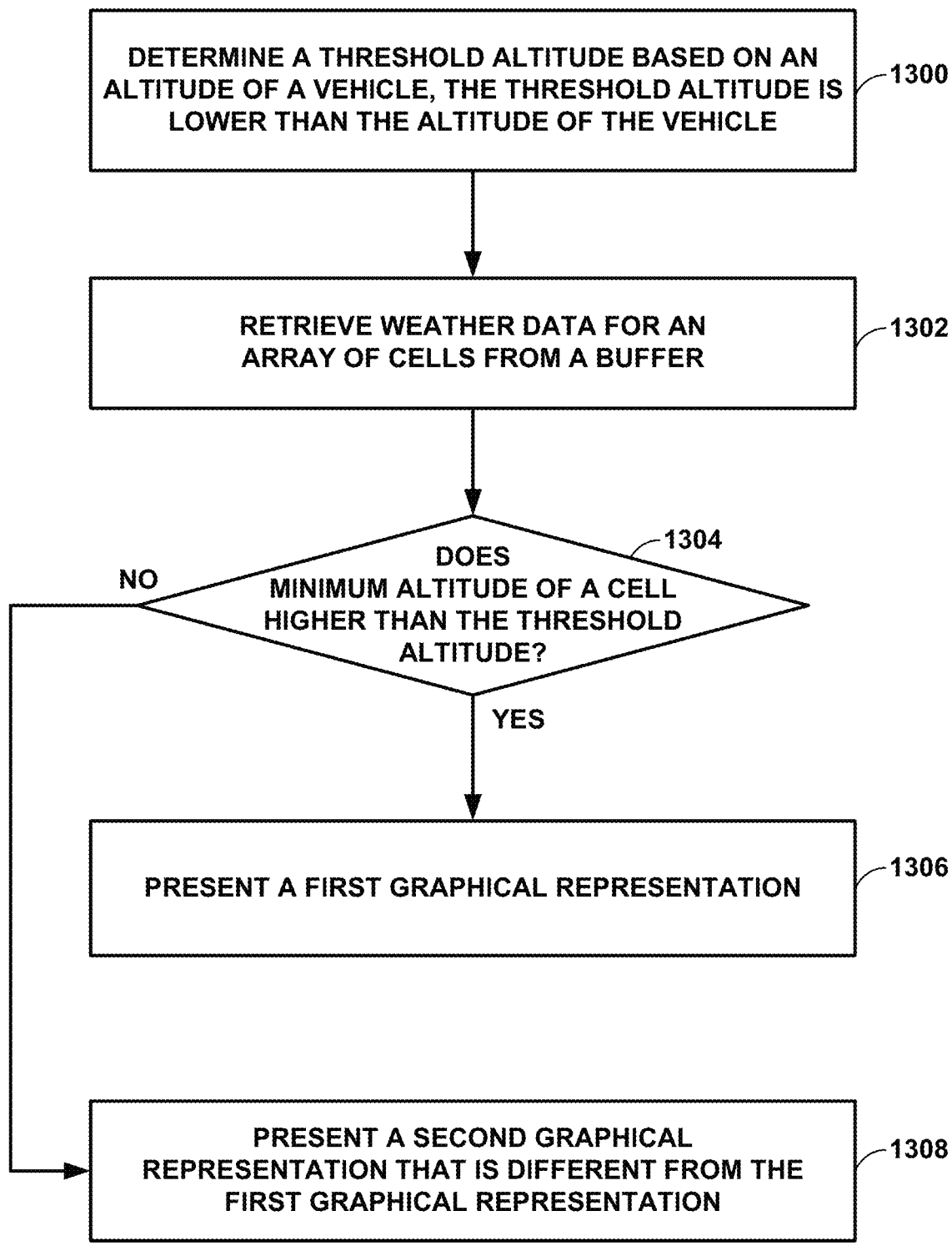

FIGS. 12 and 13 are flowcharts illustrating example processes for retrieving weather data from a volumetric buffer, in accordance with some examples of this disclosure. The techniques of FIGS. 12 and 13 are described with reference to processing circuitry 240 shown in FIG. 2, although other components may exemplify similar techniques.

In the example of FIG. 12, processing circuitry 240 retrieves weather data from a buffer stored in memory 246 by retrieving a first reflectivity value associated with a first cell of an array of cells (1200). The buffer may include a volumetric array of weather data values, where each cell in the array represents a volume of space in the scan path of weather radar 250.

In the example of FIG. 12, processing circuitry 240 determines a parameter based on a predetermined amount, a static temperature, and/or user input 220 (1202). The parameter may be a preset, fixed value or an adjustable, configurable value. A configurable value can be changed based on user input 220 or environmental conditions such as static air temperature. For example, vehicle 200 may include sensors for detecting environmental conditions.

In the example of FIG. 12, processing circuitry 240 associates the first reflectivity value with a location based on the parameter, where an elevation of the location is lower than an elevation of a centroid of the first volume of space (1204). Instead of assigning the centroid altitude to the first reflectivity value, processing circuitry 240 can assign a lower altitude to the first reflectivity value, which may be more accurate for cells that include the tops of storm clouds. The top of a storm cloud may be present near the bottom of the volume of space represented by the first cell, and the middle and upper altitudes of the volume may have lower reflectivities. Thus, assigning a lower-than-centroid altitude to the first reflectivity value may be more accurate than assigning the centroid altitude.

Processing circuitry 240 can use the assigned altitude to determine how to present the first reflectivity value to a user. For example, processing circuitry 240 can determine whether the first reflectivity value is on- or off-path weather based on the location that is assigned to the first reflectivity value, as discussed in further detail with respect to FIG. 13. Processing circuitry 240 may be configured to present a set of reflectivity values by presenting points, colors, pixels, and/or formations on a graphical user interface. For example, processing circuitry 240 can present one or more pixels for each reflectivity value depending on the size of cells in the volumetric buffer and the resolution of the display. Additionally or alternatively, processing circuitry 240 can a single pixel representing one or more reflectivity values for relatively small cells and/or a low resolution display.

In the example of FIG. 13, processing circuitry 240 determines a threshold altitude based on the altitude of vehicle 200 (1300). The threshold altitude is lower than the altitude of vehicle 200 such that the threshold altitude represents a lower boundary of the travel path of vehicle 200. In some examples, processing circuitry 240 can determine the threshold altitude by subtracted a predetermined amount from the altitude of vehicle 200, where the predetermined amount may be three, four, or five thousand feet in some examples.

In the example of FIG. 13, processing circuitry 240 retrieves weather data for an array of cells from a buffer stored in memory 246 (1302). As processing circuitry 240 retrieves the weather data (e.g., reflectivity value, turbulence value, and/or variance in reflectivity or wind) from each cell, processing circuitry 240 assigns an altitude to each weather data value. Although processing circuitry 240 is described in the example of FIG. 13 as assigning the minimum altitude of a cell to the weather data retrieved from the cell, processing circuitry 240 can assign a different altitude to the retrieved weather data.

In the example of FIG. 13, processing circuitry 240 determines whether the minimum altitude of a cell is higher than a threshold altitude (1304). The threshold altitude may represent the lower bound of a travel path of vehicle 200. In response to determining that the minimum altitude is higher than the threshold altitude, processing circuitry 240 may categorize the respective weather data value as on-path weather and present a first graphical representation for the on-path weather (1306). In response to determining that the minimum altitude is not higher than the threshold altitude, processing circuitry 240 may categorize the respective weather data value as off-path weather and present a second graphical representation for the off-path weather (1308). The first and second graphical representations may have different colors, light intensities, brightness, saturation, colorfulness, chroma, shadings, markings, translucency, opaqueness, or any other characteristics. For example, processing circuitry 240 may present on-path weather as more colorful and/or brighter than off-path weather. Additionally or alternatively, processing circuitry 240 may present off-path weather with hashed markings (e.g., graphical representation 870 shown in FIG. 8B) and present on-path weather without hashed markings (e.g., graphical representation 860).

The following numbered examples demonstrate one or more aspects of the disclosure.

Example 1. A method includes retrieving weather radar data from a buffer storing volumetric weather data, where retrieving the weather radar data comprises retrieving a first reflectivity value associated with a first cell of the buffer, and wherein the first cell represents a first volume of space. The method also includes determining an altitude of a first location based on a parameter and an altitude extent of the first volume of space, where the altitude of the first location is lower than an altitude of a centroid of the first volume of space. The method further includes associating the first reflectivity value with the first location.

Example 2. The method of example 1, further including storing the buffer including volumetric buffer data.

Example 3. The method of example 1 or example 2, wherein the parameter comprises a configurable parameter.

Example 4. The method of examples 1-3 or any combination thereof, wherein the parameter comprises a preset or predetermined parameter.

Example 5. The method of examples 1-4 or any combination thereof, further including determining the configurable parameter based on user input.

Example 6. The method of examples 1-5 or any combination thereof, further including determining the altitude of the first location based on the configurable parameter or based on the preset or predetermined parameter.

Example 7. The method of examples 1-6 or any combination thereof, further including determining the configurable parameter by determining an altitude percentage.

Example 8. The method of examples 1-7 or any combination thereof, further including determining the altitude of the first location based on the altitude percentage and the altitude extent of the first volume of space.

Example 9. The method of examples 1-8 or any combination thereof, further including determining the parameter based on an ambient temperature.

Example 10. The method of examples 1-9 or any combination thereof, further including determining a travel path for a vehicle.

Example 11. The method of examples 1-10 or any combination thereof, further including determining that a first set of reflectivity values stored in the buffer indicates on-path weather for the vehicle by determining that locations associated with the first set of reflectivity values are within the travel path for the vehicle.

Example 12. The method of examples 1-11 or any combination thereof, wherein an altitude of each location associated with a reflectivity value of the first set of reflectivity values is lower than a centroid of a respective volume of space represented by a respective cell of the buffer.

Example 13. The method of examples 1-12 or any combination thereof, further including determining an altitude of a vehicle.

Example 14. The method of examples 1-13 or any combination thereof, further including determining a threshold altitude based on the altitude of the vehicle, wherein the threshold altitude is lower than the altitude of the vehicle.

Example 15. The method of examples 1-14 or any combination thereof, further including determining that a first set of reflectivity values indicate on-path weather for the vehicle by determining that altitudes of locations associated with the first set of reflectivity values are higher than the threshold altitude, wherein an altitude of each location associated with a reflectivity value of the first set of reflectivity values is lower than a centroid of a respective volume of space represented by a respective cell of the buffer.

Example 16. The method of examples 1-15 or any combination thereof, further including associating the first set of reflectivity values with the on-path weather for the vehicle.

Example 17. The method of examples 1-16 or any combination thereof, further including determining that a second set of reflectivity values indicate off-path weather for the vehicle by determining that altitudes of locations associated with the second set of reflectivity values are lower than the threshold altitude, wherein an altitude of each location associated with a reflectivity value of the second set of reflectivity values is lower than a centroid of a respective volume of space represented by a respective cell of the buffer.

Example 18. The method of examples 1-17 or any combination thereof, further including associating the second set of reflectivity values with the off-path weather for the vehicle.

Example 19. The method of examples 1-18 or any combination thereof, further including determining the threshold altitude by subtracting a predefined distance from the altitude of the vehicle.

Example 20. The method of examples 1-19 or any combination thereof, further including presenting, via a display, the on-path weather data for the vehicle using a first graphical representation.

Example 21. The method of examples 1-20 or any combination thereof, further including presenting, via the display, the off-path weather data for the vehicle using a second graphical representation, the second graphical representation being different than the first graphical representation.

Example 22. The method of examples 1-21 or any combination thereof, further including determining whether the altitude of the first location is higher than a threshold altitude.

Example 23. The method of examples 1-22 or any combination thereof, further including presenting, via a display, a first graphical representation of the first reflectivity value in response to determining that the altitude of the first location is higher than the threshold altitude.

Example 24. The method of examples 1-23 or any combination thereof, further including presenting, via the display, a second graphical representation of the first reflectivity value in response to determining that the altitude of the first location is higher than the threshold altitude, the second graphical representation being different than the first graphical representation.

Example 25. A system includes a memory configured to store a buffer storing volumetric weather data. The system also includes processing circuitry configured to retrieve weather radar data from the buffer by retrieving a first reflectivity value associated with a first cell of the buffer, wherein the first cell represents a first volume of space. The processing circuitry is also configured to associate the first reflectivity value with a first location that is lower than an altitude of a centroid of the first volume of space.

Example 26. The method of example 25, where the processing circuitry is further configured to determine an altitude of the first location based on a parameter and an altitude extent of the first volume of space.

Example 27. The method of example 25 or example 26, processing circuitry configured to perform the method of examples 1-24 or any combination thereof.

Example 28. A device includes a computer-readable medium having executable instructions stored thereon, configured to be executable by processing circuitry for causing the processing circuitry to perform the method of examples 1-24 or any combination thereof.

Example 29. The device of example 28, where the instructions are configured to cause the processing circuitry is configured to perform the method of examples 1-24 or any combination thereof.

Example 30. A system includes means for performing the method of examples 1-24 or any combination thereof.

The disclosure contemplates computer-readable storage media including instructions to cause a processor to perform any of the functions and techniques described herein. The computer-readable storage media may take the example form of any volatile, non-volatile, magnetic, optical, or electrical media, such as a random access memory (RAM), read-only memory (ROM), non-volatile RAM (NVRAM), electrically erasable programmable ROM (EEPROM), or flash memory. The computer-readable storage media may be referred to as non-transitory. A computing device may also contain a more portable removable memory type to enable easy data transfer or offline data analysis.

The techniques described in this disclosure, including those attributed to processing circuitry 240 and various constituent components, may be implemented, at least in part, in hardware, software, firmware or any combination thereof. For example, various aspects of the techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices, such as between processing circuitry 240. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors.

In some examples, a computer-readable storage medium includes non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein, including, but not limited to, processing circuitry 240 may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A system comprising:
   a memory configured to store a buffer storing volumetric weather data; and
   processing circuitry configured to:
   retrieve weather radar data from the buffer by retrieving each of a reflectivity value in a first plurality of reflectivity values, each reflectivity value being associated with a voxel of space of a plurality of voxels, each voxel of space having an associated centroid location and being adjacent to another voxel of space in the plurality of voxels;
   determine an altitude of each location of a plurality of locations, based on a parameter of a plurality of parameters, and an altitude extent of a plurality of altitude extents, for each voxel of space, wherein each location of the plurality of locations is within an associated voxel of space;
   determine whether the altitude of each location of the plurality of locations is lower than an altitude of the centroid location of the associated voxel of space,
   in response to determining the altitude of a location is lower than the altitude of the centroid of the associated voxel of space, associate the reflectivity value with the location, for each altitude of each location, of the plurality of locations, that is lower than the altitude of the centroid location of the associated voxel of space.

2. The system of claim 1,
   wherein each the parameter comprises a configurable parameter,
   wherein the processing circuitry is configured to:
   determine each of a configurable parameter of a plurality of configurable parameters based on user input; and
   determine the altitude of each of a location of a plurality of locations based on the configurable parameter.

3. The system of claim 2,
   wherein the processing circuitry is configured to determine each of the configurable parameters of plurality of the configurable parameters by determining an altitude percentage, and
   wherein the processing circuitry is configured to determine the altitude of each of the locations of the plurality of locations based on the altitude percentage and the altitude extent of each of the voxels of space of the plurality of voxels.

4. The system of claim 1, wherein the processing circuitry is configured to:
determine each of the parameters of the plurality of parameters based on an ambient temperature; and
determine each of the altitudes of the plurality of altitudes for each of the locations of the plurality of locations based on each of the parameters of the plurality of parameters.

5. The system of claim 1, wherein the processing circuitry is configured to:
determine a travel path for a vehicle;
determine that each of the reflectivity values in a second plurality of reflectivity values stored in the buffer indicates on-path weather for the vehicle by determining that each location of the plurality of locations associated with the second plurality of reflectivity values are within the travel path for the vehicle, wherein each altitude of a plurality of altitudes, of each location, of a plurality of locations, is associated with a reflectivity value of the second plurality of reflectivity values is lower than a centroid of a respective voxel of space, of a plurality of voxels; and
associate the first plurality of reflectivity values with the on-path weather for the vehicle.

6. The system of claim 1, wherein the processing circuitry is configured to:
determine an altitude of a vehicle;
determine a threshold altitude based on the altitude of the vehicle, wherein the threshold altitude is lower than the altitude of the vehicle;
determine that a second plurality of reflectivity values indicate on-path weather for the vehicle by determining that each altitude of each location of a second plurality of locations associated with the second plurality of reflectivity values is higher than the threshold altitude, wherein an altitude of each location associated with a reflectivity value of a second set of reflectivity values is lower than a centroid of a respective voxel of space represented by a respective element of the buffer; and
associate the second plurality of reflectivity values with the on-path weather for the vehicle.

7. The system of claim 6, wherein the processing circuitry is configured to:
determine that a third set of reflectivity values indicate off-path weather for the vehicle by determining that altitudes of locations associated with the third set of reflectivity values are lower than the threshold altitude, wherein an altitude of each location associated with a reflectivity value of the third set of reflectivity values is lower than a centroid of a respective voxel of space; and
associate the third plurality of reflectivity values with the off-path weather for the vehicle.

8. The system of claim 6, wherein the processing circuitry is configured to determine the threshold altitude by subtracting a predefined distance from the altitude of the vehicle.

9. The system of claim 8, wherein the processing circuitry is configured to:
present, via a display, the on-path weather data for the vehicle using a first graphical representation; and
present, via the display, the off-path weather data for the vehicle using a second graphical representation, the second graphical representation being different than the first graphical representation.

10. The system of claim 1, wherein the processing circuitry is configured to:
determine whether the altitude of each location, in the first plurality of locations, is higher than a threshold altitude;
present, via a display, a first graphical representation of each reflectivity value with an altitude of a location associated with the reflectively value, in response to determining that an altitude of a location, in the plurality of locations is-higher than the threshold altitude; and
present, via the display, a second graphical representation of each reflectivity value with an altitude of a location associated with the reflectively value, in response to determining that an altitude of a first location, in the plurality of locations is higher than the threshold altitude, the second graphical representation being different than the first graphical representation.

11. A method comprising:
retrieving weather radar data from a buffer storing reflectivity values, wherein retrieving the weather radar data comprises retrieving each reflectivity value of a first plurality of values, each reflectivity value associated with a first voxel an element of the buffer, and wherein the first element represents a first voxel of space;
determining an altitude of a first location based on a parameter and an altitude extent of the first voxel of space, wherein the first location is within the first voxel of space and the altitude of the first location is lower than an altitude of a centroid of the first voxel of space; and
associating the first reflectivity value with the first location.

12. The method of claim 11, wherein each parameter of the plurality of parameters comprises a configurable parameter, the method further comprising:
determining each configurable parameter of a plurality of parameters based on user input; and
determining the altitude of each of a location of a plurality of locations based on the configurable parameter.

13. The method of claim 12,
wherein determining each of the configurable parameters of the plurality of parameters comprises determining an altitude percentage, and
wherein determining the altitude of each of the locations of the plurality of locations is based on the altitude percentage and the altitude extent of each of the voxels of space of the plurality of voxels.

14. The method of claim 11, further comprising:
determining each of the parameters of the plurality of parameters based on an ambient temperature; and
determining each of the altitudes of the plurality of altitudes for each of the locations of the plurality of locations based on each of the parameters of the plurality of parameters.

15. The method of claim 11, further comprising:
determining an altitude of a vehicle;
determining a threshold altitude based on the altitude of the vehicle, wherein the threshold altitude is lower than the altitude of the vehicle;
determining that each of the reflectivity values in a second plurality of reflectivity values indicate on-path weather for the vehicle by determining that each altitude of each location in the plurality of locations associated with each reflectivity value in the first plurality of reflectivity values are higher than the threshold altitude, wherein an altitude of each location associated with a reflectivity value of the second plurality of reflectivity values is lower than a centroid of a respective voxel of space represented by a respective cell of the buffer; and associating the second plurality of reflectivity values with the on-path weather for the vehicle.

16. The method of claim 15, further comprising:

determining that a third plurality of reflectivity values indicate off-path weather for the vehicle by determining that each altitude of each location associated with the third plurality of reflectivity values is lower than the threshold altitude; and associating the third plurality of reflectivity values with the off-path weather for the vehicle.

17. The method of claim 16, further comprising:

presenting, via a display, the on-path weather data for the vehicle using a first graphical representation; and presenting, via the display, the off-path weather data for the vehicle using a second graphical representation, the second graphical representation being different than the first graphical representation.

18. The method of claim 11, determining whether the altitude of the first location is higher than a threshold altitude;

presenting, via a display, a first graphical representation of the second plurality of reflectivity values in response to determining that the altitude of a location in the plurality of locations is higher than the threshold altitude; and presenting, via the display, a second graphical representation of the second plurality of reflectivity values in response to determining that the altitude of a location in the plurality of locations is higher than the threshold altitude, the second graphical representation being different than the first graphical representation.

19. A system comprising:

a memory configured to store a buffer storing volumetric weather data, wherein each element of the buffer represents a respective voxel of space; and processing circuitry configured to:

determine a threshold altitude based on an altitude of a vehicle, wherein the threshold altitude is lower than the altitude of the vehicle;

retrieve weather radar data from the buffer;

determine whether a minimum altitude of each voxel of space represented by a respective reflectivity value stored as an element of a buffer, is higher than the threshold altitude;

present, via a display, a first graphical representation for a first subset of the buffer in response to determining that minimum altitudes of elements in the first subset of the buffer are higher than the threshold altitude; and present, via the display, a second graphical representation for a second subset of the buffer in response to determining that minimum altitudes of elements in the second subset of the buffer are lower than the threshold altitude, the second graphical representation being different than the first graphical representation.

20. The system of claim 19, wherein the processing circuitry is configured to determine the threshold altitude by subtracting a predefined distance from the altitude of the vehicle.

* * * * *